(12) United States Patent
Sankaran et al.

(10) Patent No.: US 8,433,632 B2
(45) Date of Patent: Apr. 30, 2013

(54) INTERACTIVE METHOD AND APPARATUS FOR REAL-TIME FINANCIAL

(75) Inventors: Sarat C. Sankaran, San Carlos, CA (US); Vineet Jain, Milpitas, CA (US); Nancy B. Capelli, Woodside, CA (US)

(73) Assignee: Lawson Software, Inc., St. Paul, MN (US)

( * ) Notice: Subject to any disclaimer, the term of this patent is extended or adjusted under 35 U.S.C. 154(b) by 3229 days.

(21) Appl. No.: 09/804,851

(22) Filed: Mar. 13, 2001

(65) Prior Publication Data
US 2002/0133444 A1 Sep. 19, 2002

(51) Int. Cl.
*G60Q 40/00* (2006.01)
(52) U.S. Cl.
USPC .......................................... 705/36 R
(58) Field of Classification Search .............. 705/35–42
See application file for complete search history.

(56) References Cited

U.S. PATENT DOCUMENTS

| | | | |
|---|---|---|---|
| 5,621,201 A | 4/1997 | Langhans et al. | |
| 5,914,472 A | 6/1999 | Foladare et al. | |
| 6,012,044 A | 1/2000 | Maggioncalda et al. | |
| 6,021,943 A | 2/2000 | Chastain | |
| 6,029,158 A | 2/2000 | Bertrand et al. | |
| 6,073,127 A | 6/2000 | Lannert et al. | |
| 6,173,269 B1 * | 1/2001 | Solokl et al. | 705/35 |
| 6,351,734 B1 * | 2/2002 | Lautzenheiser et al. | 705/8 |
| 6,804,657 B1 * | 10/2004 | Sultan | 705/10 |
| 7,110,976 B2 * | 9/2006 | Heimermann et al. | 705/37 |
| 7,130,822 B1 * | 10/2006 | Their et al. | 705/35 |
| 7,255,282 B2 * | 8/2007 | Vanzini et al. | 235/486 |
| 2001/0041996 A1 | 11/2001 | Eder | |
| 2002/0077992 A1 * | 6/2002 | Tobin | 705/65 |
| 2002/0095363 A1 | 7/2002 | Sloan et al. | |
| 2002/0111890 A1 | 8/2002 | Sloan et al. | |

FOREIGN PATENT DOCUMENTS

| | | |
|---|---|---|
| JP | 2002092465 A | 3/2002 |
| WO | WO 02/073365 A2 | 9/2002 |

OTHER PUBLICATIONS

Emond, Mark; Fleet Cards, Marketers Prosper with Websites on the Internet; National Petroleum News; vol. 89, Iss. 2, pp. 32-38; (Feb. 1997).*

(Continued)

*Primary Examiner* — Virpi Kanervo
(74) *Attorney, Agent, or Firm* — Blank Rome LLP

(57) ABSTRACT

A method and apparatus for financial planning and control are disclosed that are capable of real-time response to changing market conditions. The disclosed method provides financial management and control tools that allow an organization to rapidly (on weekly or monthly frequencies, for example) realign financial resources throughout the organization in response to changing market and business conditions. The method links critical external information directly to company decision-making activities to allow a business to better align resources to capitalize upon opportunities or minimize the impact of adverse business conditions. The disclosed embodiment of the invention comprises several modules, including the TopLine Planner™ module, BizPlan™ module, and SpendCap Manager™ module. The TopLine Planner™ module receives inputs from and provides information to sales, marketing and manufacturing, and is coupled to the BizPlan™ module. The TopLine Planner™ module dynamically revises topline forecast information by capturing current outlook information from front line sources. Revenue information is passed between the TopLine Planner™ module and the BizPlan™ module. The BizPlan™ module rapidly refreshes expense plan information by using business rules and constraints. The BizPlan™ module is coupled to the SpendCap Manager™ module, and expense information is passed between the modules. The SpendCap Manager™ module distributes resources to all business managers and receives requests for increases in the allocation of resources.

5 Claims, 16 Drawing Sheets

OTHER PUBLICATIONS

Skoufos et al; Olfactory Receptor Database: A Database of the Largest Eukaryotic Gene Family; Nucleic Acid Research, vol. 27, Iss. 1, p. 343; (Jan. 1999).*

Sanders, Bob; Internet or Intranet? It All Depends on Your Needs; New Hampshire Busioness Review; vol. 19, Iss. 23, p. 1; (Oct. 1997).*

* cited by examiner

FIG. 13

| SpendCap Manager | DEPARTMENT | CORPORATE ▽ | | | | | | | |
|---|---|---|---|---|---|---|---|---|---|
| MYPLAN | SHAREDPLAN | REQUESTS | REPORTS | CONFIG | | | | | |

SpendCap Assignment | Admin Expense Planning
SpendCap Assignment: Corporate

◁◁ ◁ (M) (Q) (Y) △ ▷▷

Logout  Help  Customer Support  Printable Format (Calculate) (Save) (Publish) (Export)

| ($'000) | Q1FYO1 | Q2FYO1 | Q3FYO1 | Q4FYO1 | Q1FYO2 | Q2FYO2 | Q3FYO2 | Q4FYO2 |
|---|---|---|---|---|---|---|---|---|
| SpendCap | 1,000.0 | 1,000.0 | 1,000.0 | 1,000.0 | 1,000.0 | 1,000.0 | 1,000.0 | 1,000.0 |
| Corporate-Admin | 100.0 | 100.0 | 100.0 | 100.0 | 100.0 | 100.0 | 100.0 | 100.0 |
| Sales & Marketing | 300.0 | 300.0 | 300.0 | 300.0 | 300.0 | 300.0 | 300.0 | 300.0 |
| R & D | 200.0 | 200.0 | 200.0 | 200.0 | 200.0 | 200.0 | 200.0 | 200.0 |
| Production | 250.0 | 250.0 | 250.0 | 250.0 | 250.0 | 250.0 | 250.0 | 250.0 |
| Q & A | 100.0 | 100.0 | 100.0 | 100.0 | 100.0 | 100.0 | 100.0 | 100.0 |
| Total | 950.0 | 950.0 | 950.0 | 950.0 | 950.0 | 950.0 | 950.0 | 950.0 |
| Last Published | 950.0 | 950.0 | 950.0 | 950.0 | 950.0 | 950.0 | 950.0 | 950.0 |
| Difference | 0.0 | 0.0 | 0.0 | 0.0 | 0.0 | 0.0 | 0.0 | 0.0 |
| Available Spend Cap | 50.0 | 50.0 | 50.0 | 50.0 | 50.0 | 50.0 | 50.0 | 50.0 |

Comments: - based on ramp of product a
          - no headcount growth

1300

CINDY JONES (Corporate)                                    9.5.2000 9:12 (SC 2.1.2.04.004)

SpendCap Manager

MYPLAN | SHAREDPLAN | REQUESTS | REPORTS

New SpendCap Request Instrumentation ($'000)

1500

| | JANFY01 | FEBFY01 | MARFY01 | APRFY01 | MAYFY01 | JUNFY01 | JULFY01 | AUGFY01 | SEPFY01 | OCTFY01 | NOVFY01 | DECFY01 |
|---|---|---|---|---|---|---|---|---|---|---|---|---|
| Amount Requested | 0.0 | 0.0 | 0.0 | 0.0 | 0.0 | 15.4 | 0.0 | 0.0 | 1.7 | 0.0 | 0.0 | 2.6 |
| Current SpendCap | 26.7 | 26.7 | 26.7 | 26.7 | 26.7 | 26.7 | 26.7 | 26.7 | 26.7 | 26.7 | 26.7 | 26.7 |
| New SpendCap | 26.7 | 26.7 | 26.7 | 26.7 | 26.7 | 42.1 | 26.7 | 26.7 | 28.4 | 26.7 | 26.7 | 29.3 |

Comments: Need additional funding in June for Graphics Conference and misc spending in Q3 and Q4

JOE BLACK (INSTRUMENTATION)    9.5.2000 9:44 (SC 2.1.2.04.004)

*FIG. 15*

INTERACTIVE METHOD AND APPARATUS FOR REAL-TIME FINANCIAL

BACKGROUND OF THE INVENTION

1. Technical Field

The present invention relates, generally, to methods typically implemented as a suite of software applications designed to enable real-time financial planning and to drive the responsive allocation of financial resources.

2. Background Art and Technical Problems

Financial management and planning has been of crucial importance to business enterprises for many years. The success or failure of almost any significant business venture may depend upon the effectiveness of financial management and control measures. While the presence of effective financial planning and management processes will not guarantee the success of a business, the absence of such processes is a recipe for failure.

In the past, financial planning and management tools and procedures were unsatisfactory in that business conditions were not reflected in the financial plan or budget frequently enough. Changes in expense targets were not communicated in a timely manner. Budgets were submitted in multiple inconsistent formats. Budgets would not include all of the managers' inputs. The cumbersome roll-up of departments would involve long cycle times. It has been difficult for businesses to maintain earnings predictability, link operational decisions to financial objectives, and allocate resources efficiently.

In the past, financial planning has been performed using spreadsheet type methods, where various scenarios may be re-calculated with the aid of software programs, such as Microsoft Excel™. Typically, each manager or business unit would have to do its own independent spreadsheet calculation, based upon each individual's estimates and formulas. Sharing such data within an organization might be accomplished by attaching files to e-mail communications. There were no formal interactions between each software tool used at each level. Higher level managers would often be faced with submissions from a plurality of lower level managers in inconsistent formats, and the consolidation of lower level input into a high level financial plan would be cumbersome and time consuming. If resources had to be re-allocated to accomplish changes in a business plan or to respond to changes in conditions, no mechanism was available in the software to facilitate such re-allocations or the negotiation of such changes in the business plan. Such methods were less than completely satisfactory, because the financial planning process tended to be laborious and slow.

Prior art methods have been unsatisfactory because decision-making power in businesses has become increasingly decentralized, and such prior methods fail to incorporate input from line managers.

Current methods are unsatisfactory because they do not have an effective mechanism for incorporating and responding to new external data reflecting changes in the assumptions upon which a financial plan may be based. A financial plan may be based upon certain assumptions concerning projected sales, market size, business conditions, and other external data. Often, financial management systems do not quickly respond to changes in such assumptions until the end of the current planning period, when actual results may be compared to the previous estimates. Businesses that do not have financial planning systems capable of real-time response to such events may only find out too late in a quickly changing market that resources has been allocated in a less than optimum fashion, that business opportunities have been missed, and that financial performance has been diminished by undue delay in implementing an effective response to a change in market conditions.

Modern businesses more and more have to respond to rapid changes in the business environment. The need for a financial management system that enables real-time planning and market-responsive allocation of resources has grown in recent years. There is a need for a financial management system that is capable of transforming the planning process into an efficient method of steering the organization, by linking critical external information directly to company decision-making activities. More effective financial management systems would allow a business to better align resources to capitalize upon opportunities or minimize the impact of downturns or adverse conditions. There is a need for financial management and control tools that allow an organization to rapidly (on weekly or monthly frequencies, for example) realign financial resources throughout the organization in response to changing market and business conditions.

There is also a need for financial planning tools that facilitate the negotiation of changes in the allocation of resources. A lower level manager needs a mechanism built into the financial planning software for requesting an increase in the manager's budget when circumstances so dictate. In the past, such negotiations had to be conducted off-line, and software tools for financial planning had no mechanism to facilitate the process.

In recent years, the growth of the Internet has offered a new tool for communication and networking of software tools. There is a growing need to have software financial planning tools that take advantage of the Internet. Organizations spread over geographically diverse locations need financial planning tools that integrate seamlessly and facilitate financial management and control throughout the organization regardless of geographical location or distance. In addition, in the past it has been typical to implement software tools that require each individual user to install and maintain application software on each individual's computer. Updates and maintenance of such software tools in a large organization may present formidable obstacles. The is a need for software financial planning tools that take advantage of the Internet and which provide access to remotely hosted applications securely and reliably from anywhere in the world using a standard Internet browser.

While effective financial planning and management tools and processes have long been recognized as important to the success of business enterprises, efforts in the past to implement effective financial planning and management controls and procedures have not been altogether satisfactory. There is a significant need for improved methods and procedures for financial planning and control that are capable of real-time response to changing market conditions and which overcome some of the problems with the prior art methods and procedures.

SUMMARY OF THE INVENTION

In accordance with an exemplary embodiment of the present invention, a method and apparatus for financial planning and control are provided.

One embodiment of the invention comprises a TopLine Planner™ module, a BizPlan™ module, and a SpendCap Manager™ module. The TopLine Planner™ module receives inputs from and provides information to sales, marketing and manufacturing, and is coupled to the BizPlan™ module. The TopLine Planner™ module dynamically revises topline forecast information by capturing current outlook information from front line sources. Revenue information is passed between the TopLine Planner™ module and the BizPlan™ module. The BizPlan™ module rapidly refreshes expense plan information by using business rules and constraints. The BizPlan™ module is coupled to the SpendCap Manager™ module, and expense information is passed between the modules. The SpendCap Manager™ module distributes resources to all business managers and receives requests for increases in the allocation of resources.

The top-down mechanism employed by the SpendCap™ Manager is significantly different from existing budgeting applications that enable solely expense planning rolled up from the bottom. Expense plans made bottom-up often exceed the spending capability of a company and multiple iterations of negotiations are usually necessary to contract the expense plan so that it falls within bounds. Because of the cuts performed after a plan is made, business managers often do not feel ownership of and accountability for their budgets. These problems are eliminated with the use of SpendCap™ Manager.

A method and apparatus in accordance with the present invention provide financial planning and control processes that are capable of real-time response to changing market conditions. A method and apparatus in accordance with the present invention provide financial management and control tools that allow an organization to rapidly (on weekly or monthly frequencies, for example) realign financial resources throughout the organization in response to changing market and business conditions. The present invention provides an efficient process for steering a business organization responsive to changing business conditions, by linking critical external information directly to company decision-making activities. More effective financial management systems in accordance with the present invention allow a business to better align resources to capitalize upon opportunities or minimize the impact of downturns or adverse conditions. A business enterprise may effectively respond to rapid changes in the business environment utilizing financial planning and control methods and tools in accordance with the present invention.

The disclosed method and apparatus are effective to provide a formal mechanism for negotiating an increase in a lower manager's budget for his or her division or business unit by providing a mechanism to request an increase in budget, together with a mechanism for substantiating such request.

A method and apparatus in accordance with the present invention provide software financial planning tools that take advantage of the Internet and which provide access to remotely hosted applications securely and reliably from anywhere in the world using a standard Internet browser.

BRIEF DESCRIPTION OF THE DRAWINGS

The present invention will hereinafter be described in conjunction with the appended drawing figures, wherein like numerals denote like elements, and:

FIG. 13 is a screen picture of the SpendCap Manager™ module with the MyPlan function selected;

FIG. 15 is a screen picture of the SpendCap Manager™ module with a messages or requests function selected.

DETAILED DESCRIPTION OF PREFERRED EXEMPLARY EMBODIMENTS

Figure 1:
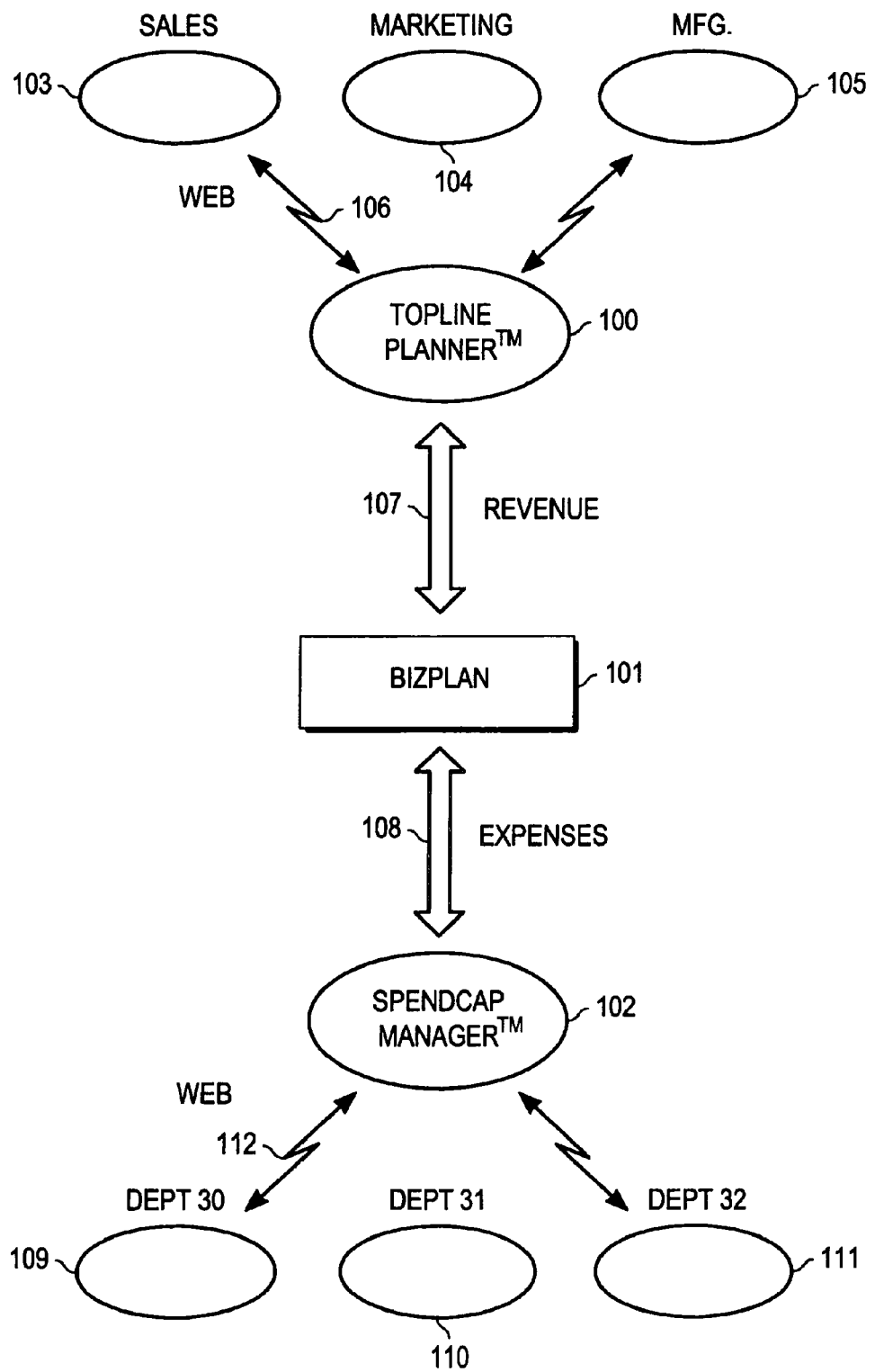
FIG. 1 is a high level schematic diagram of an embodiment of the present invention showing an overview of the interrelationship between modules.

FIG. 1 is a high level schematic diagram of an embodiment of the present invention comprising a TopLine Planner™ module 100, a BizPlan™ module 101, and a SpendCap Manager™ module 102. The TopLine Planner™ module 100 receives inputs from and provides information to sales 103, marketing 104 and manufacturing 105. The TopLine Planner™ module 100 is coupled to the BizPlan™ module 101. The TopLine Planner™ module dynamically revises topline forecast information by capturing current outlook information from front line sources 103, 104 and 105. The TopLine Planner™ module 100 is preferably linked to sales 103, marketing 104 and manufacturing 105 information sources via the Internet 106, although the inputs may alternatively be linked via a local area network or wide area network, or other suitable communications links.

Revenue information 107 is passed between the TopLine Planner™ module 100 and the BizPlan™ module 101. The BizPlan™ module 101 rapidly refreshes expense plan information by using business rules and constraints. The BizPlan™ module 101 is coupled to the SpendCap Manager™ module 102. Expense information 108 is passed between the BizPlan™ module 101 and the SpendCap Manager™ module 102. The SpendCap Manager™ module 102 distributes resources to all business managers in various departments 109, 110 and 111, and receives requests for increases in the allocation of resources. The SpendCap Manager™ module 102 is preferably linked to department 109, department 110, and department 111 via the Internet 112, although the departments may alternatively be linked to the SpendCap Manager™ module 102 via a local area network or wide area network, or other suitable communications links.

SpendCap Manager™ Module

Figure 2:
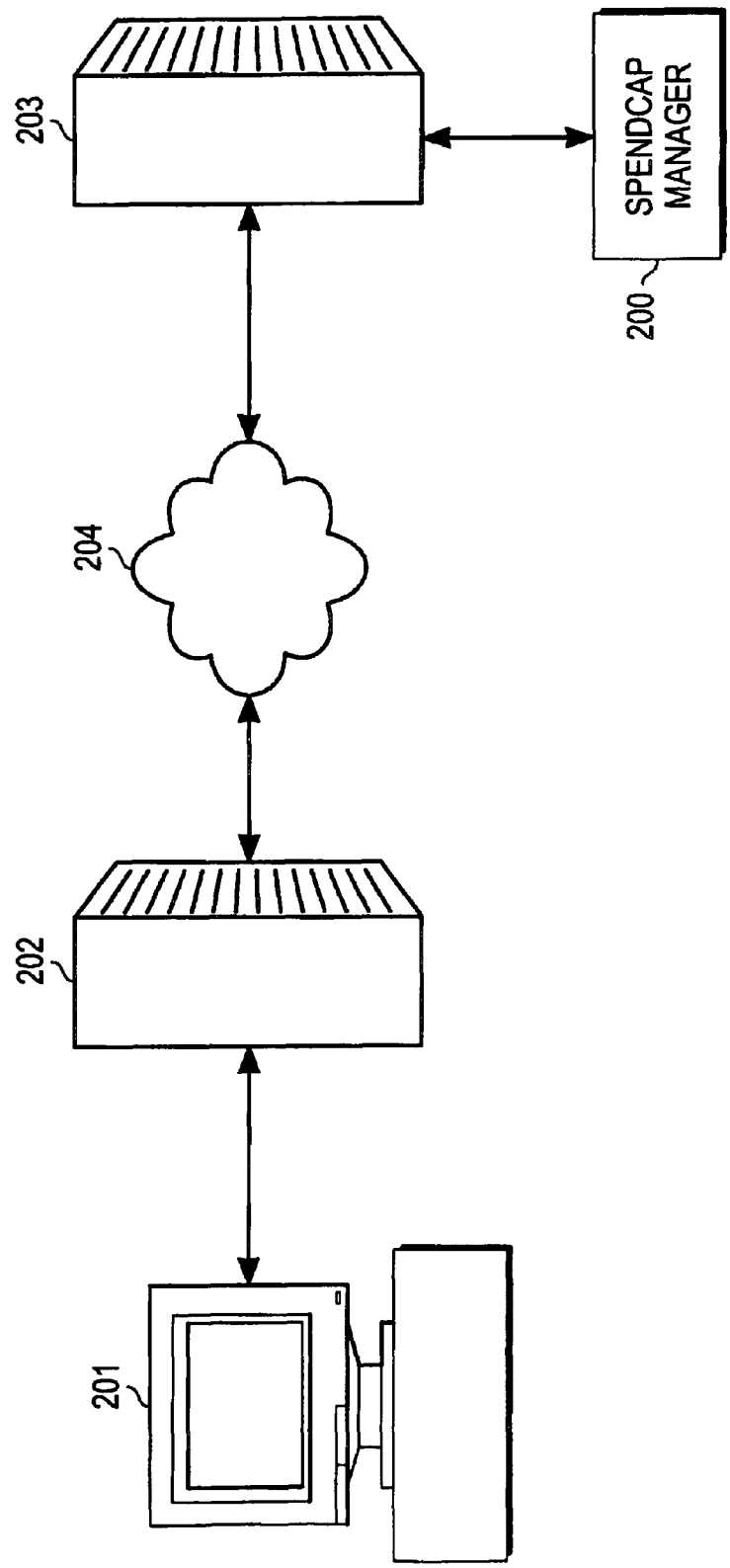
FIG. 2 is a schematic diagram showing details relating to the SpendCap Manager™ module.

The SpendCap Manager™ module 200 may be better understood with reference to FIG. 2, which is a schematic diagram illustrating details relating to the SpendCap Manage™ module 200.

The SpendCap Manager™ module 200 is preferably implemented as a web-based application server that runs as an extension or module of a web server 203. The web server 203 can be any commercially or publicly available HTTP server that implements server extensions application programming interfaces (APIs). Access to the SpendCap Manager™ module 200 is done via a uniform resource locator (URL) with special keyword that the web server 203 intercepts and redirects to the SpendCap Manager™ module 200 for processing.

A user 201 may access the SpendCap Manager™ module 200 via a local server or independent service provider server 202 that is connected to the Internet 204. Alternately, the user 201 may connect directly or indirectly to the Internet 204 with a suitable browser to create a department object in step 207. A department object is created in step 207 for the department 109 in which the user 201 belongs if it has not already been created. A department object contains its assigned spending capacity and expenses of the department 109 of the user 201 organized in multiple plan objects. A plan object represents a category of spending (called spend accounts 406) of the department 109, such as headcount, salary, travel expenses, and miscellaneous spending.

Figure 3:
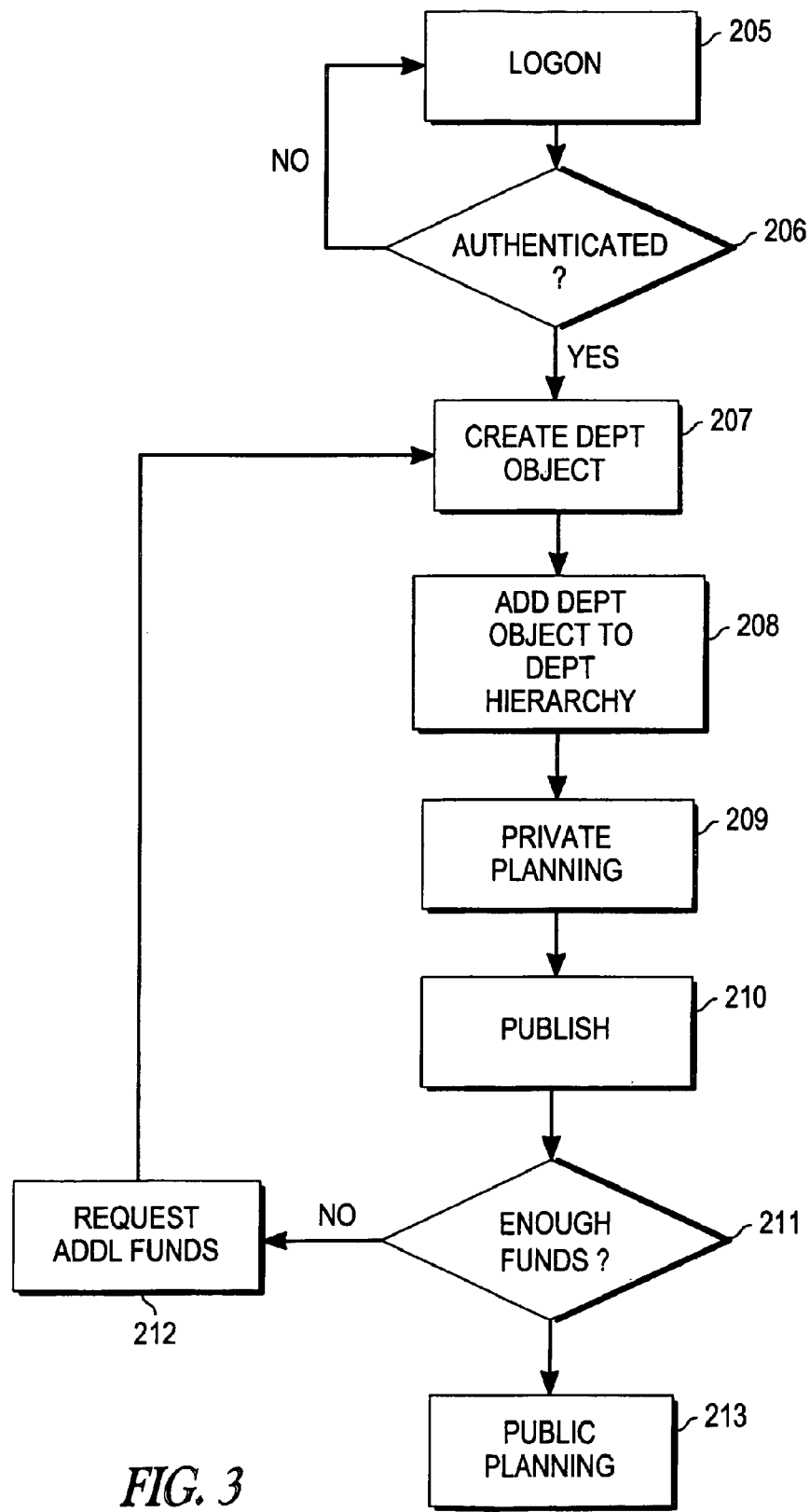
FIG. 3 is a flow chart diagram illustrating steps involved in a method implemented in the SpendCap Manager™ module.

A user 201 logs onto the system in step 205 shown in FIG. 3. If the user 201 inputs the required password or other authentication information in step 206, he or she is given access to the system 200 to create a department object in step 207. A department object is created in step 207 for the department 109 in which the user 201 belongs if it has not already been created. A department object contains its assigned spending capacity and expenses of the department 109 of the user 201 organized in multiple plan objects. A plan object represents a category of spending (called spend accounts 406) of the department 109, such as headcount, salary, travel expenses, and miscellaneous spending.

As will be explained in greater detail below, a system administrator will preferably set up a pre-existing department hierarchy to configure the system to a particular organization's needs. For example, a user such as Cindy 602, who is in charge of the Finance Department in FIG. 6, may have system administrator privileges for the organization shown. Authorized users will typically be associated with or assigned to a department or sub-organizational unit. Thus, when a user creates a department object in step 207 in FIG. 3, the department object will be added to the department hierarchy for the user's associated department in step 208.

The financial planning process is facilitated by providing users with a work area environment where users can complete their resource plans in private before making the plan public to the rest of the organization. Private planning is performed in step 209 shown in FIG. 3. When a resource plan is completed, it may be published in step 210, which will make it visible to other users of the system. For example, a manager may assign spending levels for sub-departments below his or her level in a hierarchical organizational structure. When the resource plan containing such assignments of spending levels is published in step 210 by the manager, the assigned spending levels become visible to the participants below the manager in the hierarchical organizational structure. Spending capacities can be adjusted in real-time. Although the disclosed embodiment uses the example of spending levels, the present invention may prove useful in the allocation of any resource that is to be allocated among a plurality of participants for productive use. For example, the resource being allocated may be CPU time on a computing system, electrical power among a plurality of consumers, or observing time on a space telescope. Thus, although the present disclosure uses the example of spending levels, it should be appreciated that the invention is not necessarily so limited.

The disclosed system provides a mechanism for negotiating adjustments in resource allocations. In step 211, a determination is made whether an adjustment in available resources is needed or desirable. If insufficient resources have been allocated to accomplish the plan, the process may proceed to step 212, where additional finds or other resources may be requested. Such a request typically goes to the next higher level in the organizational hierarchy as compared to the requesting user, but other configurations are possible. In the event additional resources are requested in step 212, the process proceeds back to step 207 for repeat iterations. If the allocated resources are sufficient for the present plan, the process may proceed to step 213 for public planning.

Steps 205 and 206 for logging on and authentication is produced when the two hash values equal, and thus the user is authenticated thereby in step 512. If the two hash values do not equal, the user is not authenticated in step 514.

In a preferred implementation of the invention, users must have been added to the SpendCap system under the company name before they can log on. Adding a user will preferably yield a username and a default password, which must be changed upon first logging on to the system. When adding a user to the system, certain information is required including first/last names, username, password, name of the company, and name of the department in the company. A user may belong to more than one department.

Upon receiving the logon request, the SpendCap server attempts to authenticate the user using the attached user name, password 504, and company name. The user is authenticated only if the user name exists in the user table of the given company and the given password produces a match with the password stored in the user table. In a preferred embodiment, no password is actually stored on the server; only a hash value is stored in the user table. The hash value is generated in step 506 using a one-way hash function such as MD-5 and the password when the user is added to the system. A match of the passwords thus requires generating the hash value 506 using the given password 504 using the same hashing algorithm such as MD-5, getting a password hash value from the database 508 and comparing the hash values. A match 510 is produced when the two hash values equal. If the two hash values do not equal, the user is not authenticated 514.

Figure 4:
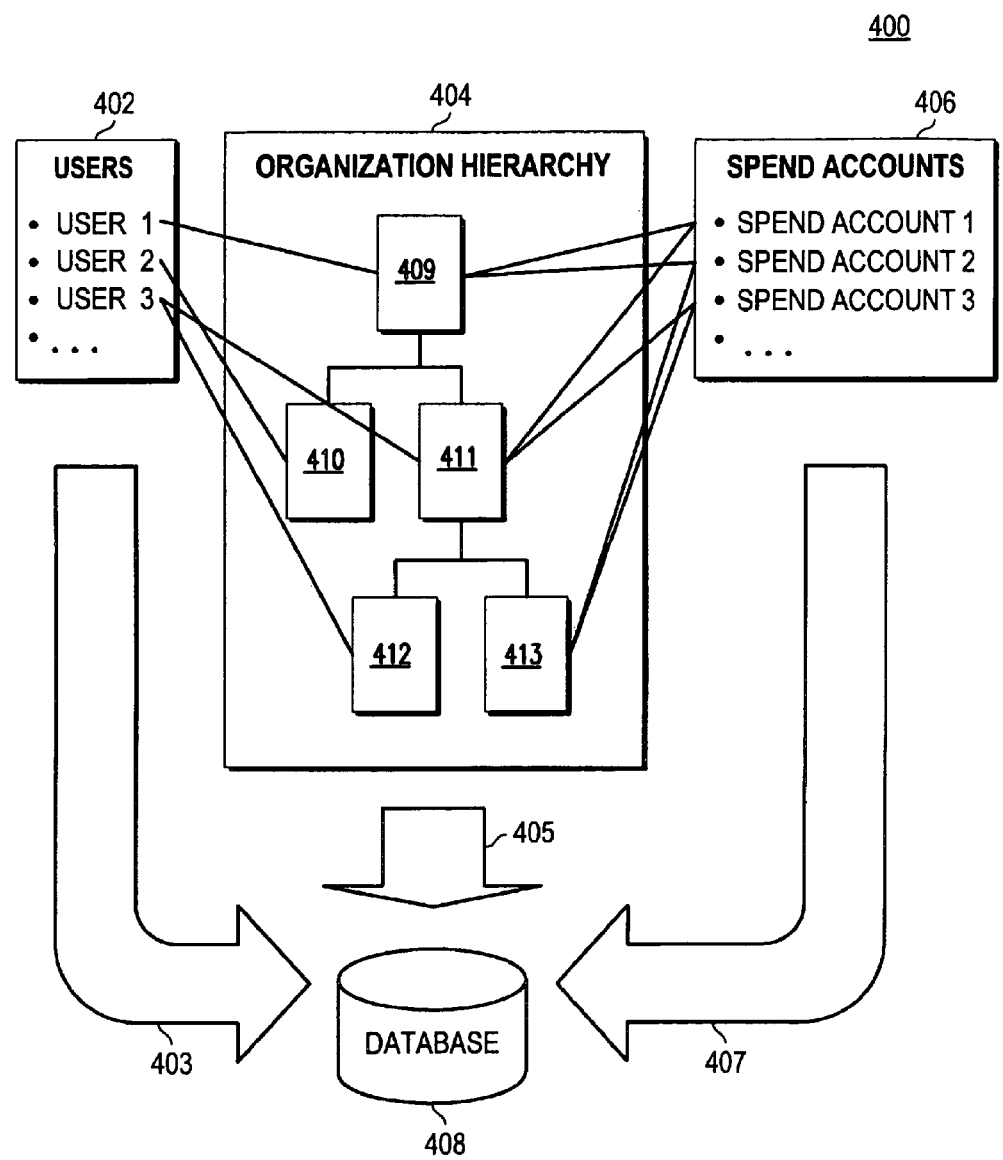
FIG. 4 is a high level schematic diagram of the structure of the SpendCap Manager™.
Figure 5:
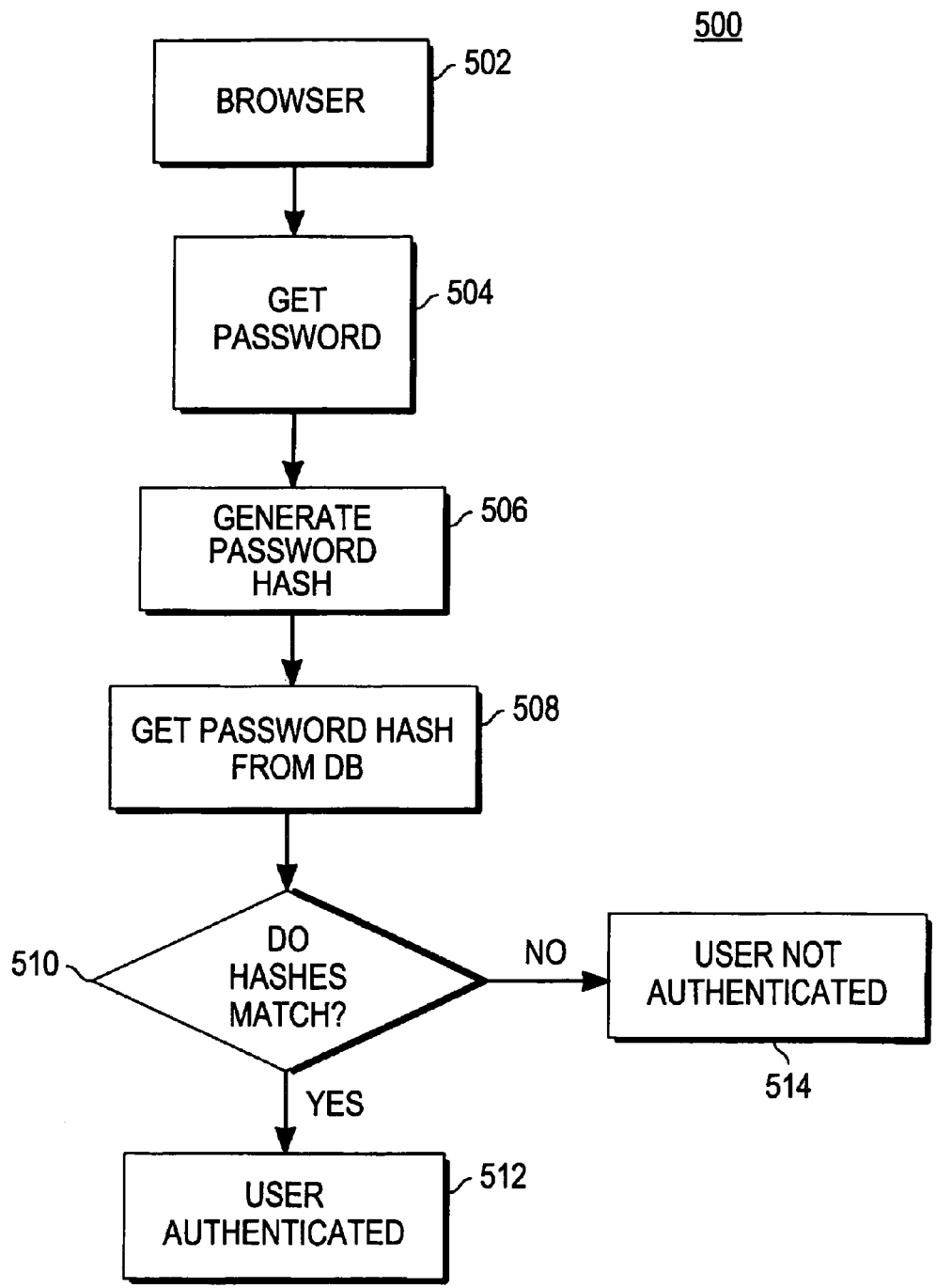
FIG. 5 is a flow chart diagram illustrating steps involved in authenticating a SpendCap Manager™ user.

Referring now to FIG. 4, the application structure 400 of the SpendCap Manager™ Module is shown. Organization hierarchy 404 is an internal tree structure that closely mirrors the organizational structure of the associated company or organization. The organization hierarchy 404 is designed to capture the parent-child relationship of department objects. For example, the organization hierarchy 404 will implement the reporting structure in an organization, so that all departments under a particular manager will be children in the hierarchy with the manager's department as their parent. For example, in FIG. 4, if the manager is in charge of a first department 409, and has a second department 410 and a third department 411 reporting to the manager, the organizational hierarchy 404 will reflect this parent-child relationship as shown in FIG. 4. Second department 410 and third department 411 will be children of parent first department 409 in the hierarchy 404. Similarly, fourth department 412, which reports to the manager of department 411, will be arranged in the hierarchy 404 as a child of parent third department 411, as will be child fifth department 413.

Figure 6:
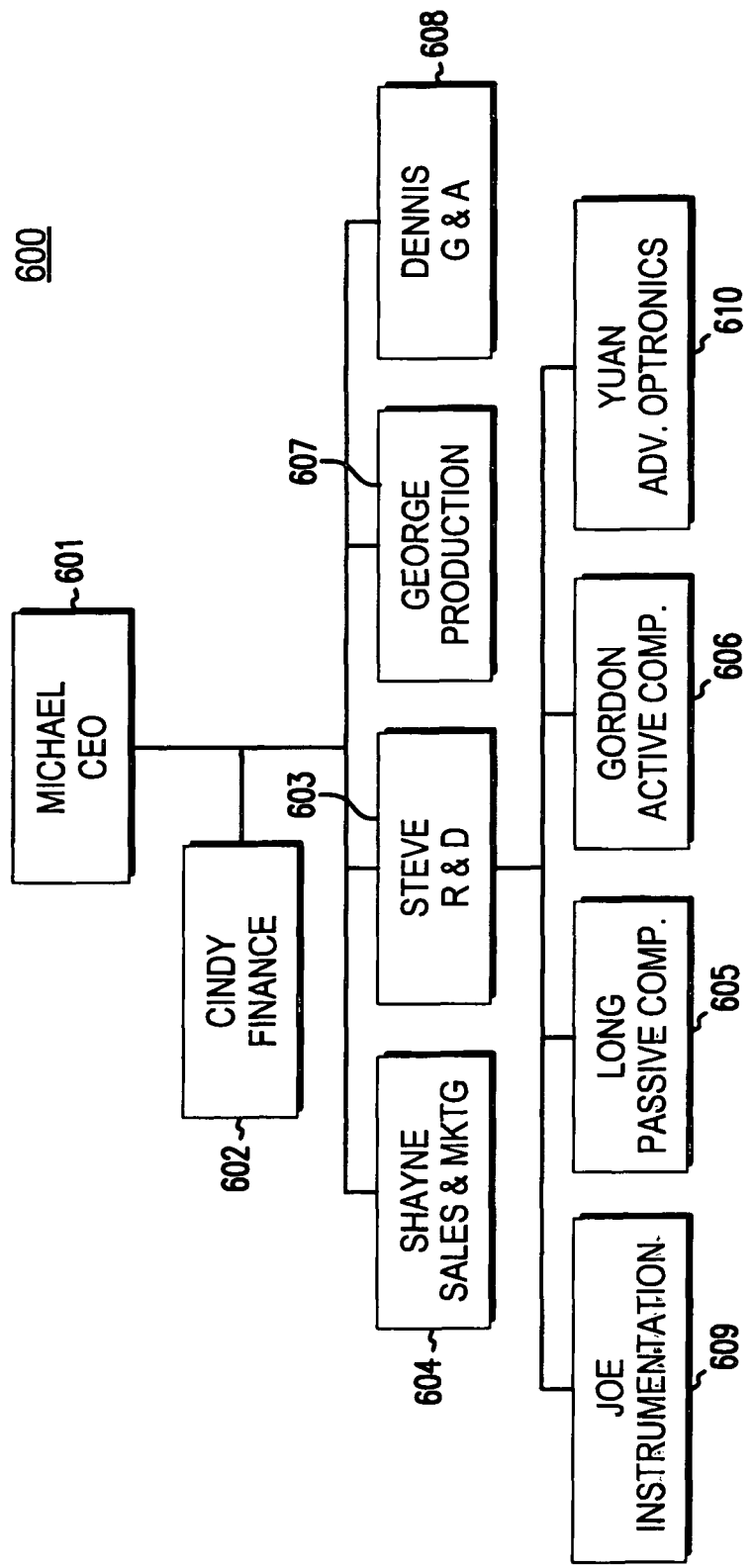
FIG. 6 is an organizational chart depicting a company hierarchy.

The relationship between the department hierarchy 404 implemented in the system and the organizational structure of the associated company may be better understood with reference to FIG. 6. The first department 409 may correspond to the CEO Michael 601 shown in FIG. 6. The second department 410 may correspond to the Sales and Marketing Department 604. The third department 411 may correspond to the R&D Department 603. Similarly, the fourth department 412 may correspond to the Passive Component Department 605, and the fifth department 413 may correspond to the Active Component Department 606. The additional departments 607, 608, 609 and 610 shown in FIG. 6 would also be represented in the organization hierarchy 404, but have been omitted from FIG. 4 for the sake of clarity.

The organization hierarchy 404 shown in FIG. 4 helps to enforce the access privilege of a user 201. Typically, a user 201 with department access will have access to his or her own department 409 for data entry and edit capability, and access to all departments or sub-departments 410, 411, 412 and 413 below him or her in the hierarchy with viewing ability.

Each department is associated with a specific subset of the global set of spend accounts 406. The list of users 402, the organization hierarchy 404, the set of spend accounts 406, and the mappings among them are all configurable on an on-going basis to match the changing needs of the deploying organization. The configuration as well as all data in the system is coupled into the stored centrally in a single database 408 via 403, 405, and 407, respectively. Individual users can access this central database 408 easily via the Internet 204 through web browsers from their own computers, such as described above for user 201 with reference to FIG. 2.

Thus, the user can be anywhere in the world and using any kind of computer and/or operating system, as long as the computer or operating system has installed a compatible web browser supporting communication with a HTTP server and display code such as HTML.

The SpendCap™ Manager simplifies planning by easily accommodating organizational needs and changes. The organizational hierarchy 404, users 402, spend accounts 406, business drivers, and plan timing elements of a business can be defined and customized by users with administrative rights and administrative access via an easy-to-use interface. Changes to this information can be done in real time. This capability is especially valuable for companies that are growing quickly, and those that undergo frequent merger and acquisition or re-organization activities. In addition, this capability provides tremendous flexibility to an organization to change or respond to market or other changing conditions. In addition, although the present example has been described with reference to the head of Finance 602 having administrative rights, it should be understood that a plurality of users may have such rights. For example, the CEO 601 may have administrative rights. Also, some users may be provided with administrative rights for only a portion of the organization hierarchy 404, which may be referred to as sub-administrative rights. For example, user Steve 603 in charge of R&D may have sub-administrative rights for the portion of the organization 609, 605, 606 and 610 that reports directly to his department can conduct planning by modifying data contained in the corresponding department object 703. The user can also view, but not modify, data contained in the department objects, which are subsets of the department object. For example, in FIG. 7, the user Steve 603 associated with department 703 could also view, but not modify, data contained in the department objects 709, 705, 706, and 710, which are subsets of the department object 703.

Figure 7:
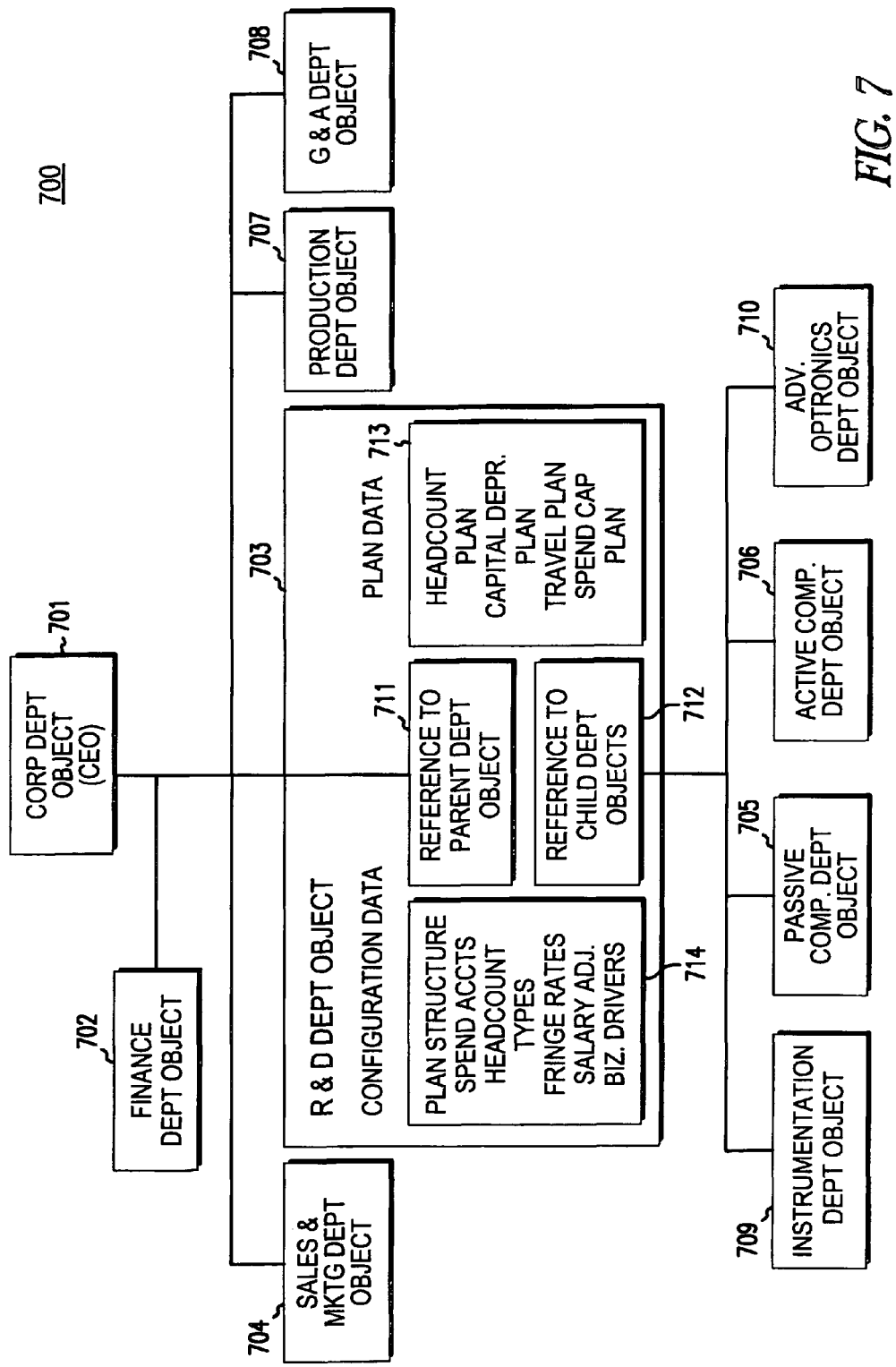
FIG. 7 is an organizational chart depicting a departmental hierarchy of the company of FIG. 6.

The SpendCap application, as will be hereinafter described in greater detail, is easily configured through use of a configuration functionality preferably implemented via a configuration tab. The areas for setup and configuration include departments, users, spending accounts, models, business drivers, currency management, cycle settings and spreading methodology. In this area of the application, users that have been setup with admin capability can add and delete departments, users, accounts, headcount categories and types. They can also assign users the responsibility of departments and can facilitate a re-organization by moving departments to report into other departments. Departments are also customized as shown in FIG. 7 to have spending accounts that are relevant, to that part of the organization. Business drivers such as salary related rates and headcount types are determined and setup using the configuration tab.

To create the organizational structure of a company in SpendCap, department objects are created and added to the department hierarchy. Each department object mirrors a physical department of the company. In addition, a department object contains a name of the physical department, configuration data, the parent department, any child departments, and the plan objects containing the financial data of the department. Thus, if FIG. 6 shows the organizational structure of a company, FIG. 7 depicts the deployed department hierarchy 700 of the company 600. Department object 701 corresponds to department 601, department object 702 corresponds to department 602, department object 703 corresponds to department 603, and so forth. FIG. 7 is therefore a more detailed representation of a department hierarchy 700 that corresponds to the department hierarchy 404 shown in FIG. 4.

The department object that is created for each user logged on is a node in the structure of the department hierarchy 700. The department hierarchy 700 is an internal tree structure that closely mirrors the organizational structure of the company 600. It captures the relationship of the department objects 701 through 710 and helps to enforce the access privilege of a user. The department object 703 assigned to the user Steve 603 when he logs on identifies the position of the user 603 in the hierarchy 700. A user can conduct planning by modifying the data contained in the department object. For example, the user Steve in charge of the R&D Department 603 can conduct planning by modifying data contained in the corresponding department object 703. The user can also view, but not modify, data contained in the department objects, which are subsets of the department object. For example, in FIG. 7, the user Steve 603 associated with department object 703 could also view, but not modify, data contained in the department objects 709, 705, 706, and 720, which are subsets of the department object 703.

The layout of the department hierarchy 700 is configured during deployment. Therefore the relationship between each department object in the department hierarchy 700 is also configured at that time. Each department object 703 contains, in addition to the financial data in plan objects 713 and configuration data 714, a reference 711 to its parent department object 701 and list of references 712 to its child department objects 709, 705, 706 and 710. The department object 703 shown in FIG. 7 is depicted in detail, with it being understood that all department objects contain similar details which are not shown in the illustrated example. A change to this department hierarchy 700, such as in the case of a company re-organization, will require the re-configuration of the relationship of the affected department objects. This will be one of the tasks for an administrator, such as user Cindy 602.

When a user, such as a user Steve 603, wishes to assign spending capacity to sub-departments 609, 605, 606 and 610, the department objects 709, 705, 706 and 710, respectively, for the sub-departments 609, 605, 606 and 610 are retrieved from the department hierarchy 700, starting from the user's department object 703 and down the list of references 712 of sub-department objects 709, 705, 706 and 710 contained in the user's department object 703. Once it is obtained, the user Steve 603 is shown the list of references 712. Any existing spending capacity is displayed; the user Steve 603 can change any of the spending capacity and save the changes. The changes are saved in the corresponding department object's spending capacity plan object 713, which is eventually persisted to a data store 408 such as a relational database system.

Planning for a department's own expenses are accomplished in a similar fashion. The user Steve 603 selects which spending category he wants to plan. The system retrieves plan objects 713 for the selected category from the user's department object 703. The spend account data included in configuration data 714 is shown to the user Steve 603. Any existing spending is included in the display. The user Steve 603 can make modifications to the planned spending and save the changes. The changes are reflected in the plan object 713 and eventually persisted to the database 408. This process is repeated for planning each spend account in the department object 703. The sum of the total of all the spending accounts and the total allocated spending capacity to the sub-departments 609, 605, 606 and 610 must not exceed the spending capacity assigned to this department for user Steve 603, as in the spending capacity plan in plan objects 713 in the department object 703. If the sum is over the spending capacity, the user Steve 603 can submit a request for additional funds, as shown in step 212 in FIG. 3.

If the additional funding is granted, the plan can be published as shown in step 210 in FIG. 3. The step 210 of publishing a plan is accomplished by copying all of the plan objects 713 in the department object 703 and marking them as public. If a plan has been published previously, it will be over-written by the newly published data. The original plan objects 713 remain in the department object 703, except they are marked as private. The user Steve 603 refining a plan will only modify the plan objects 713 that are marked with a private designation until it is decided to publish the plan.

A department object 703 is added to the department hierarchy 700 by setting the parent department field 711 of the department object 703 to an existing department object 701 that physically represents the parent department 601 of the department for the user Steve 603. Child departments 609 605, 606 and 610 are added by adding department objects 709, 705, 706 and 710 representing the physical child departments 609, 605, 606 and 610 of the department for the user Steve 603 to the list of references 712, which may also be referred to as the child department field of the department object 703.

A department object 703 may contain configuration data 714 such as plan structures or the plan objects, spend accounts, headcount types, salary-related rates, salary adjustment rates, available currencies, and business drivers. However, such configuration data 714 is not required in every department object. A department object may not physically contain any such configuration data. A setting for applicable configuration data 714 will be inherited from the parent department object 703 by sub-departments 609, 605, 606 and 610 if the configuration data 714 is not defined in sub-department objects 709, 705, 706 and 710. If a setting is defined in configuration data 714 contained in a particular department object 703, it is specific only to the department object 703 and is modifiable by the user Steve 603 associated with the department object 703. When a setting is inherited, for example by the department object 705 from the parent department object 703, the configuration data 714 cannot be modified except by the user Steve 603 of the department object 703 from which the setting is inherited.

Further, department objects 703 contain plan objects 713 such as headcount plan, salary and compensation plan, other expense plans, as well as capital depreciation plans.

Figure 8:
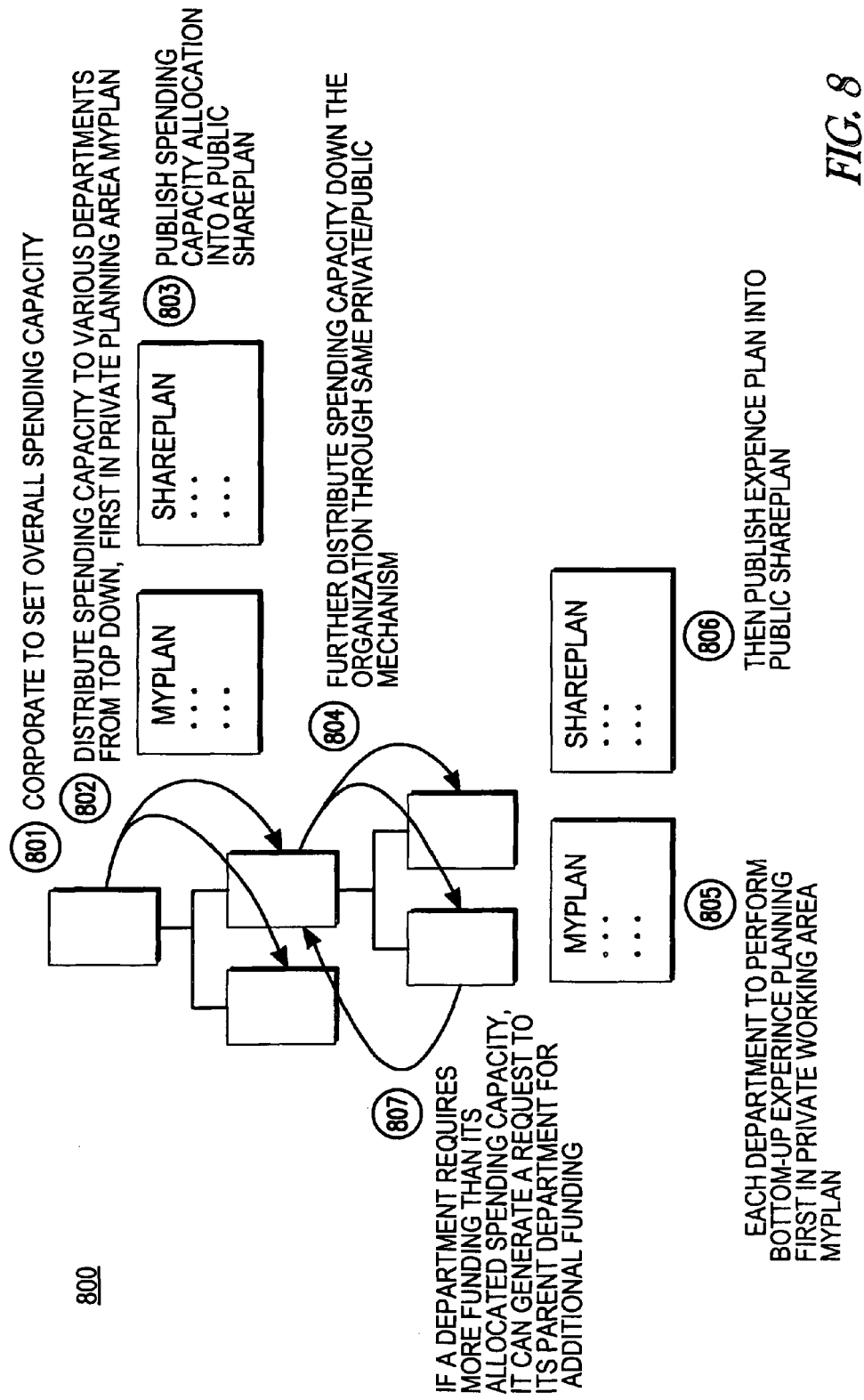
FIG. 8 is a high level schematic diagram of the application work-flow of the SpendCap Manager™.

The SpendCap™ Manager, and referring now to FIG. 8, employs a process-oriented workflow that facilitates step-by-step the financial planning process at deploying organizations. This application workflow includes, among others, such distinctive features as spending capacity top-down constraint, public vs. private planning, driver-based planning, unassigned spending capacity, and funding negotiation facilitation. Thus, the SpendCap™ Manager employs a philosophy that spending capacity is a constraint that comes from top down. Spending capacities are managed and distributed from top down through a consistent, easy-to-use interface according to up-to-date information. Each department first receives from above a maximum amount of spending allowed for the planning period, and then performs bottom-up expense planning within the constraint. This mechanism allows allocation of financial resources based on real-time business conditions to ensure that spending is in line with revenue and earnings goals. The SpendCap™ Manager top-down planning capability allows companies to rapidly inform the organization of changes in the business. The cost center managers in the organization determine their headcount and other spending based on their business requirements and their spending capacity and the two needs are integrated into a financial plan.

The top-down planning in the SpendCap™ Manager allows expense targets to be set and changed at the corporate level of the organization. These targets are then pushed down the organizational hierarchy allowing business managers to determine how to allocate the spending across cost centers. This is accomplished by assigning targets at each level of the organization hierarchy and updating the information for other participants to see the new targets in real-time over the web. The next level then assigns their spending capacity to the cost centers below them. If they do not have cost centers below them they can model their spending requirements based on headcount, capital and other requirements. At all levels, the managers cannot spend more than has been assigned to them except though approved requests. Cost center managers then publish their detail plans to the rest of the organization.

Accordingly, top-down spending capacity constraint is enforced by the SpendCap application. When a department is assigned a spending constraint, the user of that department can plan the department's expenses accordingly. Upon publishing the expense plan, total expense is validated against the assigned spending constraint contained in the Spending Capacity Plan. The plan is allowed to publish only if the total expense doesn't exceed the constraint. However, if the expense is over the assigned constraint, a request for additional funds may be submitted.

Figure 9:
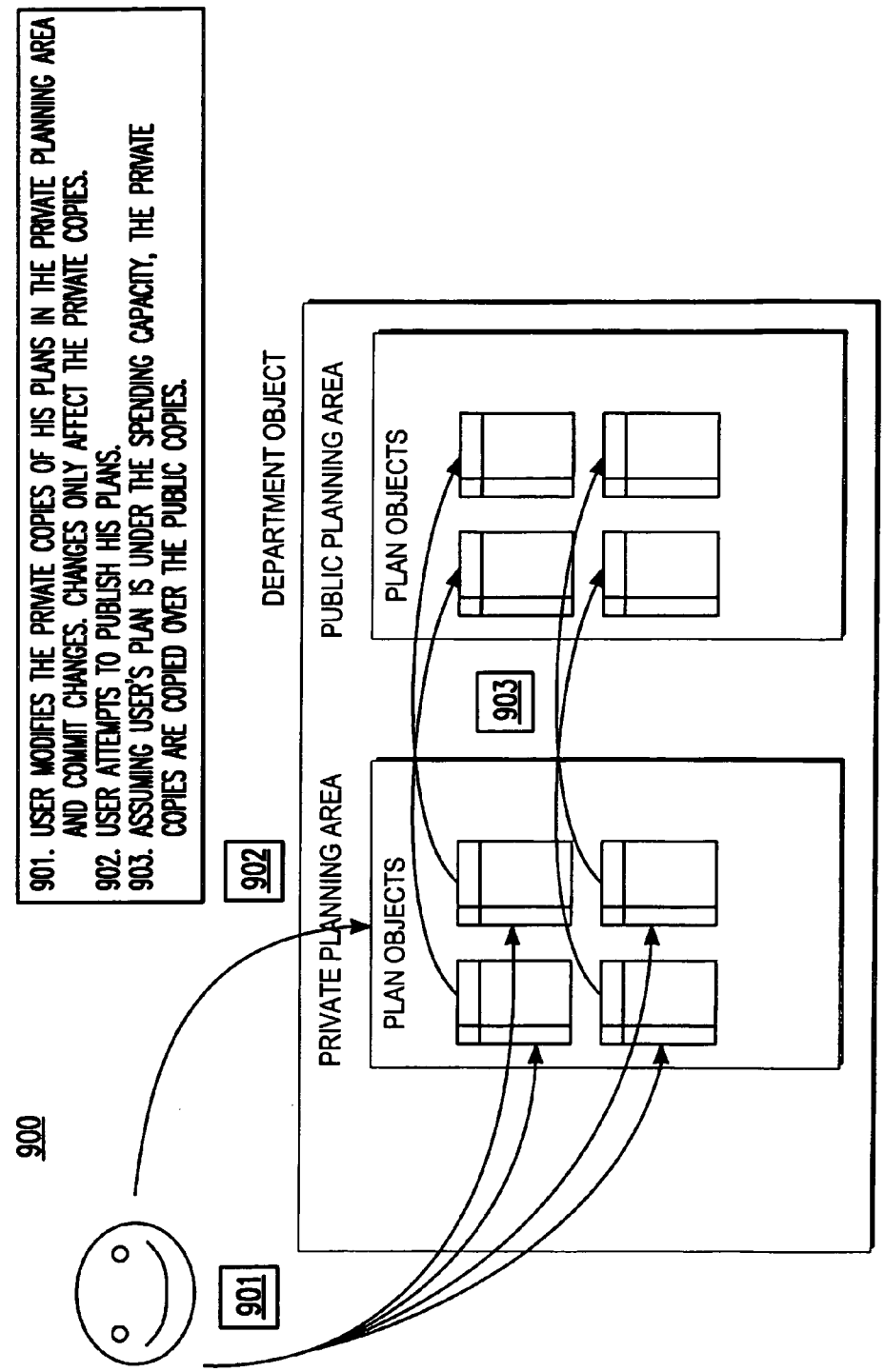
FIG. 9 is a schematic diagram depicting the relationship between the private and public planning areas of the SpendCap Manager™.

Referring now to FIG. 9, the SpendCap™ Manager provides a work area where users can complete their resource plans in private before making the plan public to the rest of the organization. The private work area enables users to model various scenarios, save preliminary plans, request additional funding, and make revisions as part of the planning process. The public area allows viewing and reporting of plans across the organization based on responsibility.

A MyPlan tab on the SpendCap display provides the private work area. There are two types of resource planning by each business manager, top-down spending capacity assignment for sub-departments, and bottom-up expense planning.

The functionality offered in MyPlan depends on the current role of the user. In both cases the user can save preliminary plans using an "Update" button on the SpendCap display, which writes the data to the database but keeps it invisible to other users. The user can then use the "Publish" button on the display to make the data visible to all users with appropriate access rights when ready. The public area is in the SharedPlan tab area of the display. Users with the appropriate responsibility can call up, view and report information in this area. Still referring to FIG. 9, the private planning data that a user published for public viewing is contained in the department object.

Once published, the public data is marked with an attribute "Public", the public data cannot be changed except through the publish process and can only be done by the owner of the department. Private data is also contained in the department object and is marked with an attribute "Private". When a user is working on a plan in the private planning area of the application, she is making changes to the data marked with the "Private" attribute. Changes will not affect the set of data marked with the "Public" attribute until the user explicitly publishes her data. When that is done, the private data is copied onto the public data, overwriting the previously published public data.

Figure 10:
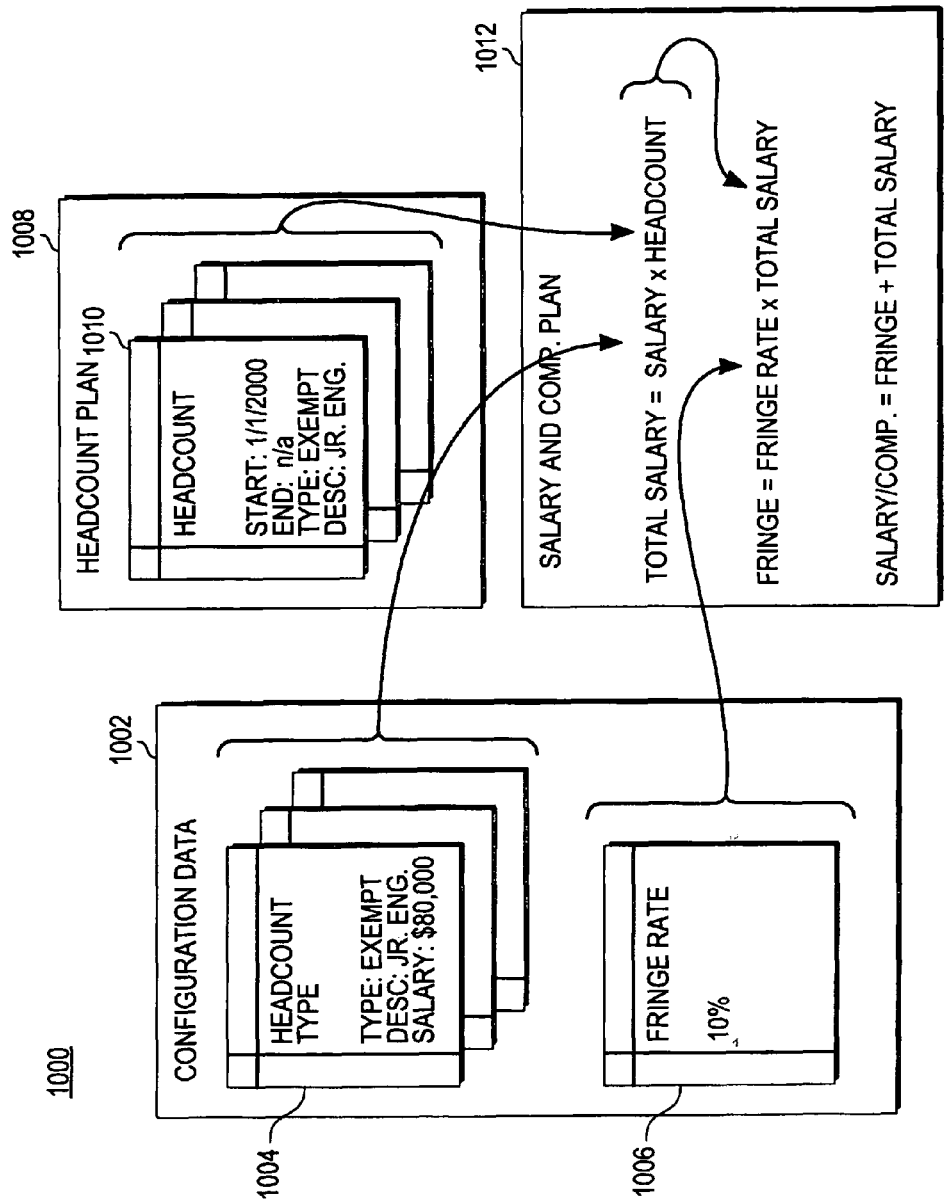
FIG. 10 is a schematic diagram depicting modules used for driver-based planning.

The SpendCap™ Manager supports an intuitive planning process for business managers through the use of drivers associated with, and referring now to FIG. 10, configuration data 1002. Expenses are calculated from a number of drivers including headcount 1004, revenue, and activities. This enables business managers to plan based on factors that are relevant and meaningful to them and not have to worry about too many details. The SpendCap™ Manager is therefore a "self-service" application for business managers, who are now able to build their financial plans without the need for handholding by financial managers.

For example, in FIG. 8, corporate sets the overall spending capacity in step 801. Then in step 802, the spending capacity is distributed to various departments from the top down. The distribution in step 802 first occurs in the private planning area called "MYPLAN." Then in step 803, the spending capacity is published into a public "SHAREDPLAN." In step 804, the spending capacity is distributed further down the organization through the same private/public mechanism. In step 805, each department performs a bottom-up expense planning, first in a private working area "MYPLAN." Then in step 806, the expense plan is published into a public "SHAREDPLAN." As depicted in step 807, if a department requires more funding than its allocated spending capacity, the department can generate a request to the department's parent department for additional funding.

Salary and related expenses are driven off a simple headcount model where business managers only have to enter base salaries and start dates for individuals and total costs are automatically calculated through a set of globally controlled drivers. The system administrator can define additional spending categories to be driven off headcount. Expenses can also be planned based on events or activities, with as much or as little details as the planning manager wishes to use. Depreciation expenses are calculated based on the plan for capital asset acquisitions, and commissions are calculated as a percentage of revenue.

For example in FIG. 9, a user modifies the private copies of his plans in the private planning area and commits changes, as depicted in step 901. Such changes only affect the private copies. In step 902, the user attempts to publish his plans. Then in step 903, assuming the user's plan is under the spending capacity, the private copies are copied over the public copies.

Certain department expenses are driven off business drivers. Headcount 1004 is a business driver and is represented by the headcount plan object 1008. The headcount plan object 1008 contains the headcount data 1010 having the total headcount of the department, including the start/end date, the headcount type which maps to salary or hourly rate. The expenses driven off the headcount plan object include the salary and compensation plan and other expense plans.

The salary and compensation plan 1012 computes the total salary for the department by totaling the salary of each headcount, which is calculated using the start/end dates and salary of each headcount. It also computes the benefit and bonus expenses by retrieving the salary-related rates from the department object and multiplying them with the computed salary. The benefit and bonus rates are retrieved from the department object of the department if it is not inherited, meaning the rates are specific to the department. In the case where the rates are defined for the entire company, the rates will be defined in the corporate department object (root of the department hierarchy) and all department objects inherit the rates.

The major expense plan contain a list of line items (minor accounts) that are associated to it such as meal, lodge, car-rental, mileage are to travel expense. Each line item is specified as a fixed amount of spending per headcount and/or a percentage of salary per headcount. The plan computes the actual expenses of each line item by multiplying the fixed amount with the total headcount or multiplying the specified rate, such as the fringe rate 1006 depicted in FIG. 10, with the salary of each headcount.

The capital asset plan is driven off asset acquisitions by the department. An acquisition by department has the date of the acquisition, the asset value and the amortization life. The capital asset plan calculates the asset depreciation expense by dividing the asset value by the amortization life. The plan calculates the total depreciation by summing the additional depreciation expenses with the existing depreciation expenses.

The SpendCap™ Manager has the capability to reserve an unassigned spending amount at every level of the organization. Business can change dramatically over time and the unassigned spending allows organizations to easily manage through the change. The unassigned category can be a buffer in case a spending capacity is decreased. It can also be used to fund an unexpected project or other spending need without having to reallocate from other parts of the organization. The unassigned function is available at all levels of the organization.

In the SpendCap™ Manager all target adjustments are automatically adjusted in the unassigned category for a department. When targets are first assigned the unassigned category will be equal to the target until the targets are passed down to the rest of the organization. As they are passed out the unassigned capacity is consumed by the amount being allocated within the company. At the lowest level of the organization, the unassigned amount is consumed when detail spending by account is published. The unassigned amount can be negative based on a top down spending directive, but cannot go below zero from bottom-up direction.

The unassigned spending capacity is stored in the unassigned plan object in the department object. When a spending capacity is first assigned to a department, the entire amount is assigned to the unassigned plan object. As expenses are planned and spending capacity allocated to sub-departments, the amount in the unassigned plan object is consumed. Conversely, when the assigned spending capacity increases or expenses shrink, the amounts in the unassigned plan object increase appropriately.

The SpendCap™ Manager provides an integrated Messages or Request function to allow users to communicate with other users in order to facilitate the planning process. One significant task that may be performed using this Message or Request function is to request additional funding from a user's parent department. This Message or Request function within the system encourages interaction in the resource allocation process, keeps funding requests in context, and eliminates the need for offline negotiation. Although described and illustrated herein as a Request function, it should be understood that the function is capable of facilitating messaging in general, and is not necessarily limited to communications in the form of a request for the allocation of additional resources. A preferred embodiment includes system-generated request forms for additional funding pre-populated with additional amounts needed (based upon the current unpublished draft plan of a user), and includes automatic incorporation of newly approved funding into the plan to reduce work for the user and to enable fast turnaround.

Requests are created via 2 mechanisms: system-generated or user-activated. When a user attempts to publish a resource allocation plan with a total exceeding his or her spending target, the system will automatically take the user to the Request tab (shown in FIG. 15), which has a set of data fields pre-populated with the additional amount needed for each time period in the planning horizon. The user can include a comment in a text box and send it to his or her superior. When the superior receives the request, he or she is able to see the amount requested for each time period and the comment made by the requestor. If the superior chooses to approve the request, the additional amount will be automatically added to the data in his or her spending capacity assignment work area. He or she can then publish the new plan, and the requester will immediately see the additional funding in his or her new spending target and be able to go ahead with the plan.

Figure 11:
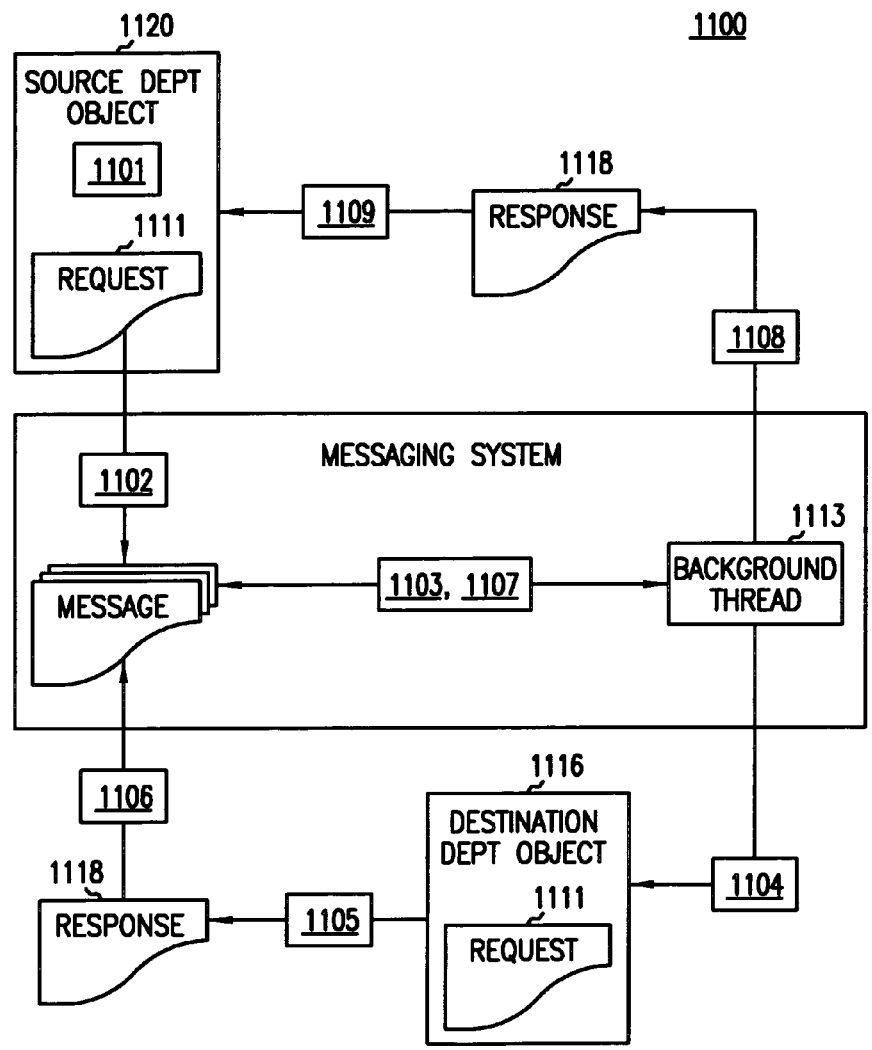
FIG. 11 is a schematic diagram depicting Funding Negotiation Facilitation.
Figure 12:
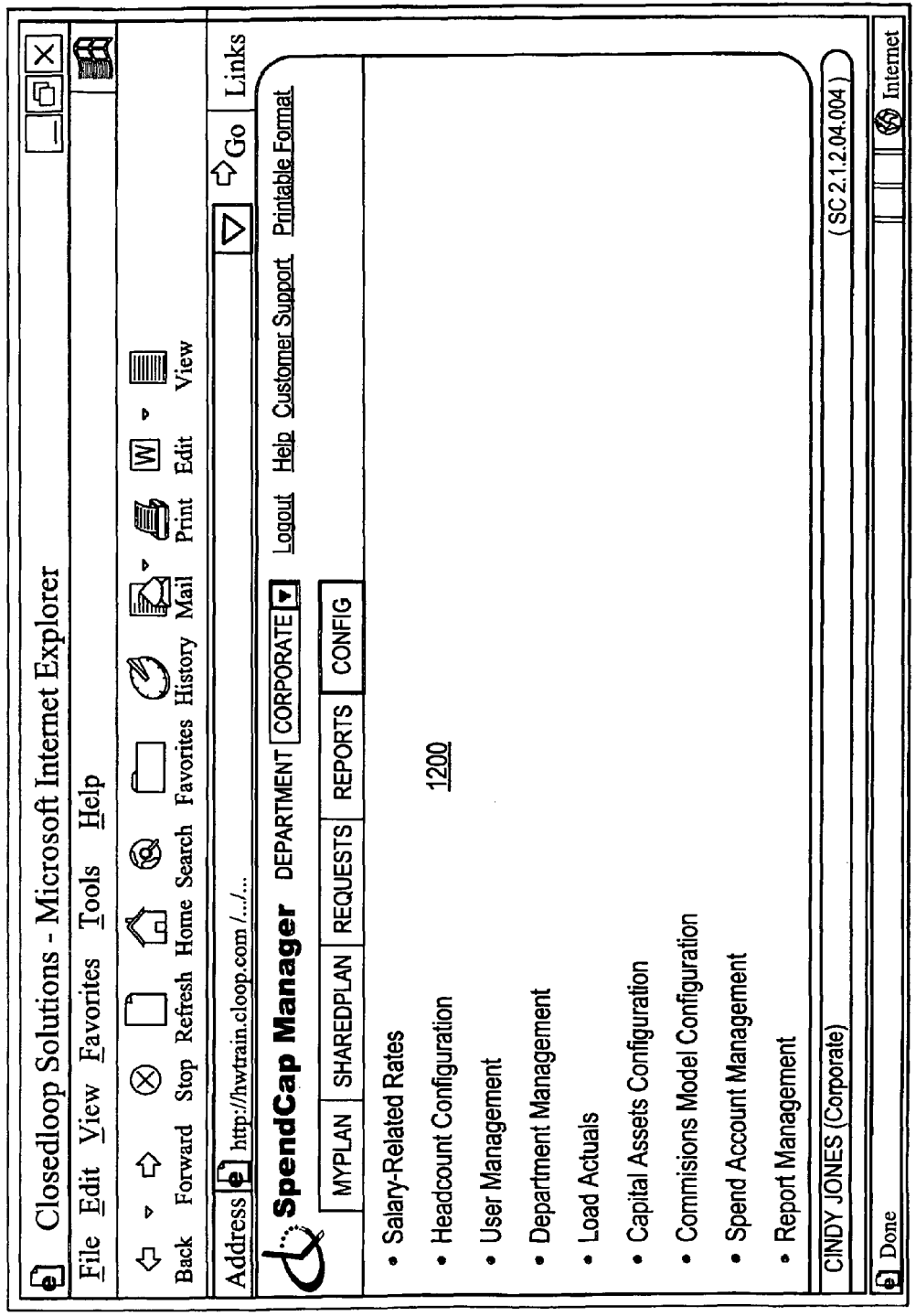
FIG. 12 is a screen picture of the SpendCap Manager™ module with the Configuration function selected.
Figure 14:
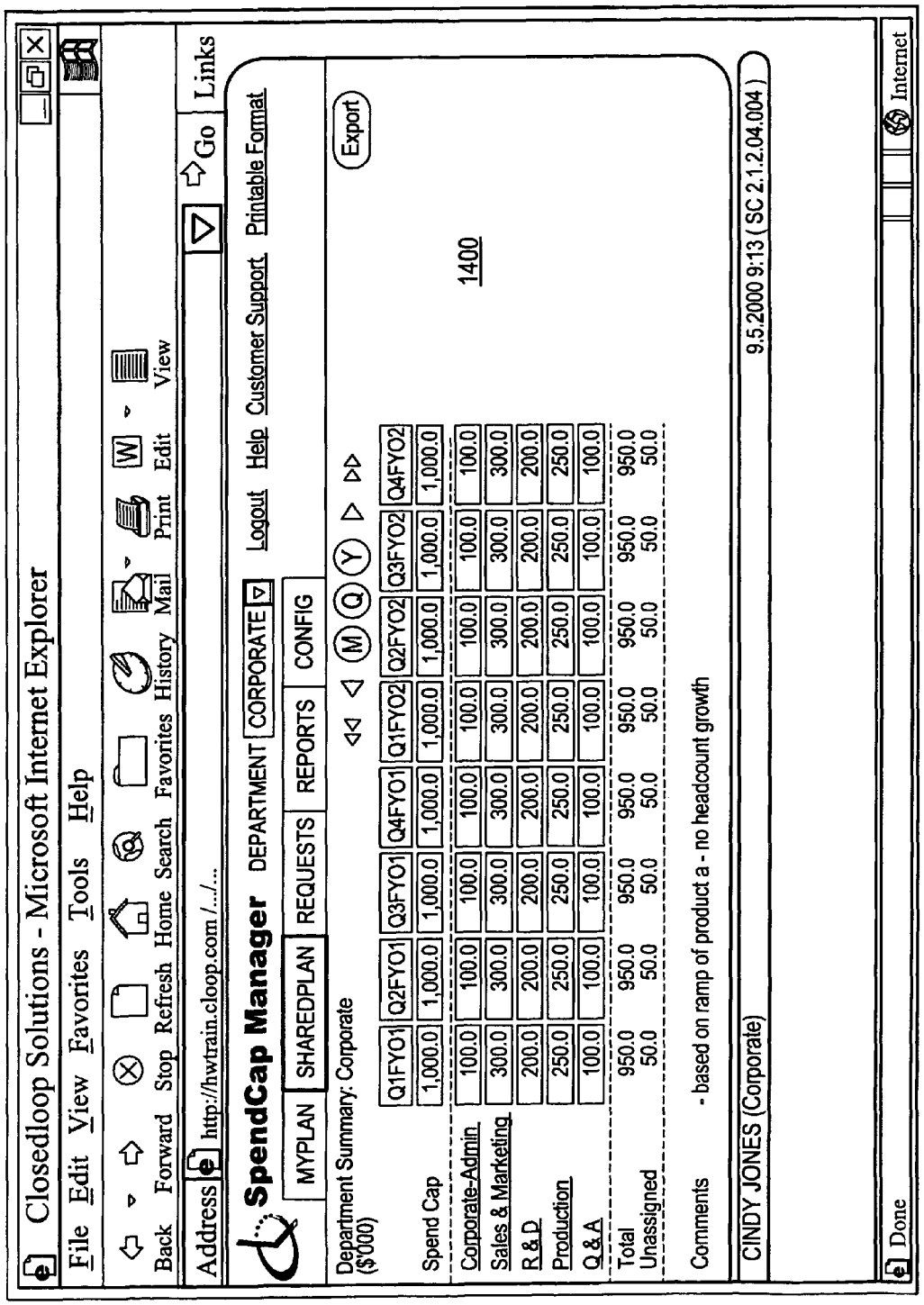
FIG. 14 is a screen picture of the SpendCap Manager™ module with the SharedPlan function selected.
Figure 16:
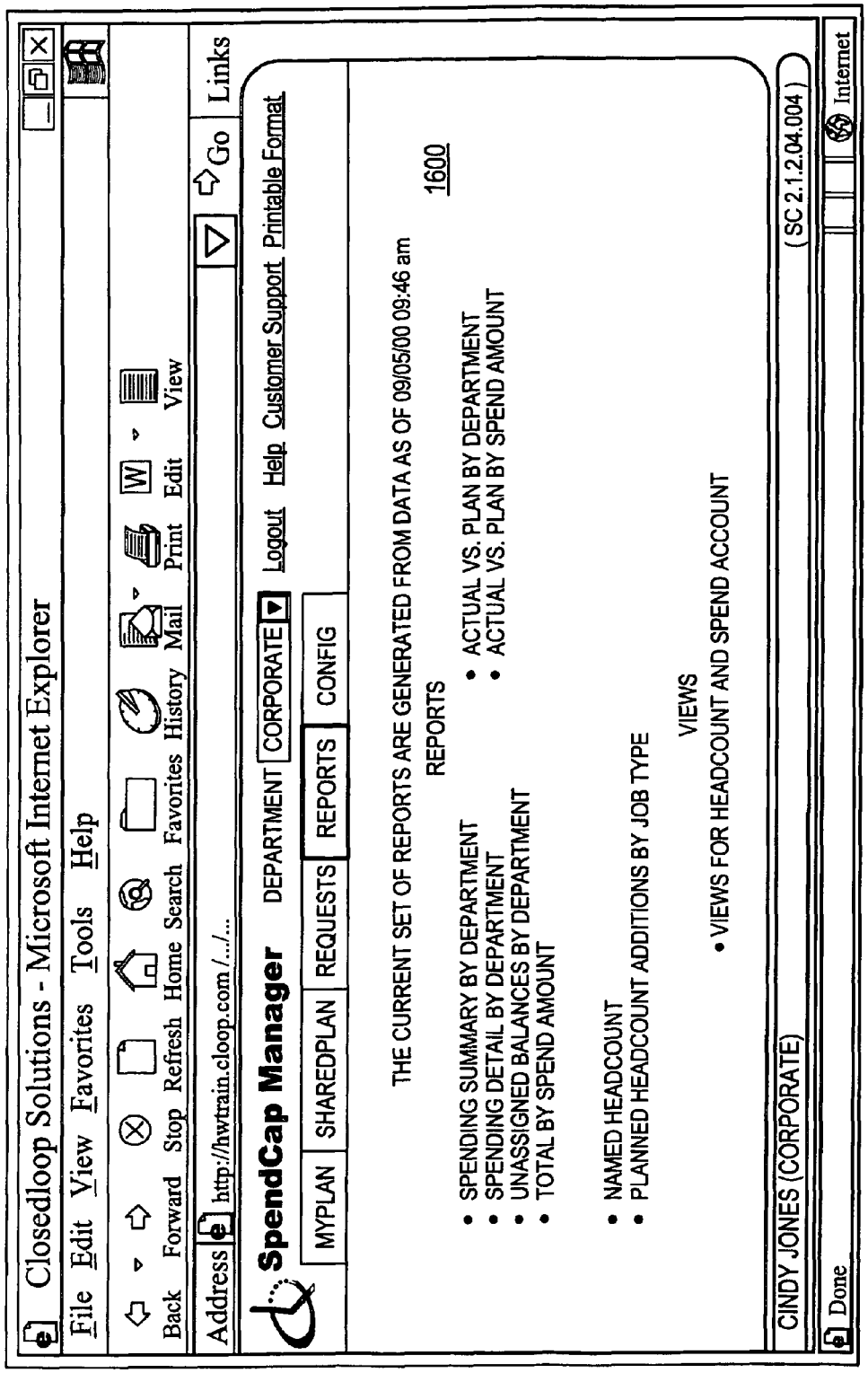
FIG. 16 is a screen picture of the SpendCap Manager™ module with the Reports function selected.

Referring to FIG. 11, when a user submits a request for additional funds as in step 1101, a request object 1111 is created. Request object 1111 contains a reference to the source department object 1120, destination department object, the current assigned spending capacity, and the additional funds requested. The source department object is the department object requesting the additional funds. The destination department object is the department object approving the request, usually the parent department object. In step 1102, request object 1111 is sent to the messaging system 1112 in the SpendCap application for forwarding to the destination department object 1116.

Messaging system 1112 is a mechanism in the SpendCap server for sending data among department objects. When request object 1111 is received by the messaging system 1112, request object 1111 is appended to an internal queue. Requests in the queue are processed in the sequence they are added by a separate thread running in the background, such as background thread 1113. In step 1103, background thread 1113 retrieves a request at a time and in step 1104 forwards the request to the destination department object 1110, which adds the request to its own internal queue of requests. The requests will show up when the user of the destination department checks for requests in the request page of the SpendCap application. In step 1105, the user can approve, partially approve or reject a request. In any case, in step 1106 a response to the request is submitted back to the messaging system 1112. The response is encapsulated in a response object 1118. Response object 1118 contains a reference to the source department object that is the destination department object 1116 in the request object 1111, a reference to the destination department object that is the source department object 1120 in the request object 1111, whether the funds were approved or rejected, and the amount approved if approved.

The response object 1118 is deposited into the messaging system's internal queue in step 1106. The background thread 1113 retrieves the response object 1118 and forwards it to the destination department object in step 1108. The department object matches the response object 1118 with the corresponding request object 1111 and updates the status of the request. If the request was approved, the approved funding is added to the previously assigned spending capacity. The new capacity will be used to enforce the spending when the user attempts to publish his plan.

A more elaborate scheme can be implemented to notify users of events that require immediate response. The messaging system can integrate with other messaging software or devices the company may standardize on, e.g., by sending e-mail messages to the user's inbox, or sending a text message to the user's pager.

Whenever a user re-allocates spending constraints to his sub-departments, a message is submitted to the message system. This message is forwarded the affected department object. When the owner of that department logs on, she will see a message notifying of the new spending constraints. If the elaborate scheme is implemented, the owner will be notified without having to log onto the SpendCap system. Instead the notification will be received in the owner's inbox or pager, depending on the configuration.

Referring now to FIGS. 12, 13, 14, 15, and 16, various screen shot displays of the SpendCap Manager™ Module are shown. The FIG. 12 screen shot displays the 'Config' tab selected, permitting the SpendCap Manager™ to be configured by the user; the FIG. 13 screen shot displays the 'MyPlan' tab selected, permitting a user to input that user's private data into the private planning area; the FIG. 14 screen shot displays the 'SharedPlan' tab selected, permitting the user's MyPlan private data to be released to the public planning area for viewing by authorized users. The FIG. 15 screen shot displays the 'Request' tab selected, permitting a user to input a request to increase the user's spending allocation. Although illustrated as a "Request" tab, the tab may also be advantageously labeled more generically as a "Messages" tab to better describe its function when the communication function is being used for a purpose other than requesting an additional allocation of resources. The FIG. 16 screen shot displays the 'Reports' tab selected, permitting a user to produce predefined reports generated from data contained in the planning areas.

TopLine Planner™ Module

The TopLine Planner™ module 100 is a web-based application that provides the functionality of rapidly refreshing revenue forecasts based upon information available to front-line participants in a business organization. Revenue forecasts may be updated based upon changes in business conditions, such as price changes by competitors, delayed product launches, natural disasters, labor strikes, new discoveries, and other factors. This functionality improves financial predictability and increases organizational responsiveness. The TopLine Planner™ module 100 provides a unified forecasting method, having distributed access within a business organization. The TopLine Planner™ module 100 is preferably linked to the SpendCap Manager™ module 102, either directly or preferably through the BizPlan™ module 101.

Spend capacity plans may be revised in the SpendCap Manager™ module 102 in response to changes in revenue forecasts received from TopLine Planner™ module 100 based upon P&L calculations performed by the BizPlan™ module 101. Although the illustrated embodiment shows the TopLine Planner™ module 100 as one module in an integrated system it, should be appreciated that the TopLine Manager™ module 100 may also function as a stand-alone module.

Front-line participants in a business organization may be a valuable source of information for revenue forecasting. Sales representatives 103 may have the best intuition about when customer deals will close, how fast new products will be adopted, and the likelihood that price concessions will be required. Marketing personnel 104 typically have valuable information about macro-market conditions that may affect revenue, and often have the best information about when product launches will occur. Manufacturing personnel 105 often have valuable information about production capacity, materials availability, and the amount of product that can be shipped during a period, which may place limitations upon revenue realization and affect revenue forecasts. Preferably, participants have the ability to enter forecast numbers only for their defined domain of responsibility.

The TopLine Planner™ module comprises two major components: a rollup mechanism, and a forecast finalizer.

The rollup mechanism helps collect and consolidate bookings and revenue forecasts within an organization. The rollup mechanism allows forecasts generated by users lower in the organization to be communicated to their superiors, who may then pass along their own forecasts to their superiors. At upper levels of the organization structure, the forecasts represent the official forecast of the organization. It is desirable to have participants forecast at the maximum level of detail at which they have intuition.

The rollup mechanism is facilitated by a data structure hierarchy in which a number of dimensions are used to specify information in the system. Each dimension may have a hierarchy of unlimited depth comprising a plurality of levels. The dimensions define how forecasts rollup within an organization and specify the data granularity of official forecasts output by the TopLine Planner™ module. Forecasts generated by participants within the organization may be consolidated into a single organizational forecast according to predefined relationships reflected by the hierarchy data structure. For example, a first level for a geographical dimension may be a world total forecast. A second (lower) level may be a region. A third (lower) level may be a country. A fourth (lower) region may be a territory within a country, such as the eastern United States. A fifth (lower) level may be a particular customer location. A participant may enter forecast data for the particular customer location. The data structure hierarchy will define how that data will rollup into the official forecast, and in this example, the data entered by the participant will rollup into the forecast for territory. The data comprising the forecast for the territory will rollup into the forecast for the country, which will rollup into the forecast for the region, and which will rollup into the total forecast for the whole world.

Participants who have the right to generate forecast data for a level, or an element within a level, of the data structure hierarchy are determined by a defined responsibility domain. If two or more participants have the right to enter data for the same element, they will be modifying the same numbers, so that only one forecast for that element exists to rollup into the official forecast. That is, only one set of forecast numbers may be passed up for any given node in the data structure hierarchy.

In a preferred embodiment, translation models are employed to relate revenue, bookings, and backlog. Participants are allowed to forecast either bookings or revenue. A translation model is used to convert bookings to revenue, and vice versa. Forecasted backlog is a calculated quantity. Preferably, participants forecast according to the level at which they have the best intuition. Thus, sales people typically can forecast in terms of bookings better than when something may be shipped. In such an example, the sales personnel would enter data for bookings forecasts, and translation models would convert the data to revenue forecasts.

A first translation model may comprise a book-to-bill conversion method. A book-to-bill ratio is bookings divided by billings, and billings equating to revenue, although discounts and returns may be taken into account. In a book-to-bill translation model, participants may forecast bookings. This is translated into revenue by dividing bookings by the book-to-bill ratio.

A second translation model is a leadtime shifting model. Leadtimes may be specified for each level of dimension data granularity. The leadtimes will time-shift bookings to revenue in a more precise way. For example, the leadtime to get a particular product family to a predetermined part of the world after receipt of order may be two months. Therefore, bookings for that product family in that predetermined part of the world should result in a revenue forecast for the same amount two months later.

In a preferred embodiment, translation models provide a model override means. For example, a major customer may have specific contract provisions that affect forecasts or revenue recognition, and in such instances the model override may be invoked to provide a corresponding portion of the forecasted revenue. In addition, foreign currency translation is also provided where applicable. Current exchange rates may be input on a real-time basis so that currency fluctuations and their effects upon revenue forecasts may be seen at any point in time.

The functionality provided by TopLine Manager™ module advantageously speeds up the flow of information going up the organization. Forecast information available to frontline participants may be quickly passed up to top line managers, where effective business decisions can be made upon the best data available in a timely manner.

The forecast finalizer takes different organizational perspectives of revenue and bookings and outputs an official corporate forecast of revenue and bookings for the short term and for the long term.

The forecast finalizer passes official forecasts of revenue, bookings, and backlog to managers or financial personnel within the company. Preferably, two sets of output are produced: a flash report and an outlook report. A flash report is a continuously updated view of revenue and bookings over a relatively short time horizon. An outlook report is a consolidated forecast for a longer period of time for longer range planning purposes.

BizPlan™ Module

The BizPlan™ module accepts revenue data inputs from the TopLine Planner™ module. The BizPlan™ module implements profit and loss model to calculate expense data used to set resource allocation information that is coupled to the SpendCap Manager™ module. For example, the BizPlan™ module takes revenue data and subtracts cost of sales and expense data to compute operating profit. In a preferred implementation, tax rate information is provided, and net profit may be calculated by subtracting projected taxes.

In addition, expense data from SpendCap Manager™ module may be passed to the BizPlan™ module to provide real-time data on current profitability. In addition, as the BizPlan™ module receives updated revenue information from the TopLine Planner module, revised expense and resource allocation data may be passed to the SpendCap Manager™ module, for example, to cause managers to effect cost saving measures or to reallocate resources. It should be appreciated that the financial plan for an organization can react quickly to changes in business circumstances based upon information that is as current and as reliable as possible.

The BizPlan™ module may provide separate high, medium, and low scenario forecasts for revenue, cost of goods sold, gross profit, and so forth. In addition, a model override function is available to discount available models and manually enter actual data as available. In an alternative embodiment, a BizPlan™ module may further provide projected profit and loss statements for various scenarios, providing "what-if" calculations as desired.

Those skilled in the art will appreciate, after having the benefit of this disclosure, that various modifications may be made to the specific embodiment of the invention described herein for purposes of illustration without departing from the spirit and scope of the invention. The description of a preferred embodiment provided herein is intended to provide an illustration of the principles of the invention, and to teach a person skilled in the art how to practice the invention. The invention, however, is not limited to the specific embodiment described herein, but is intended to encompass all variations within the scope of the appended claims.

We claim:

1. A computer-implemented method for controlling spending in a business that includes a plurality of departments, the method comprising the computer-implemented steps of:
   receiving first data input that specifies a spending capacity for a department from the plurality of departments;
   in response to receiving the first data input, creating and storing first data in a public area, wherein the first data defines the spending capacity for the department, and wherein the public area is accessible by every user in the plurality of departments;
   receiving second data input that specifies one or more planned expenses for the department;
   in response to receiving the second data input, creating and storing second data in a private area, wherein the second data defines the one or more planned expenses based on the second data input, and wherein the private area is only accessible by users in the department, and wherein the private area is separate from the public area;
   automatically determining whether the second data is greater than the first data;
   when the second data is greater than the first data,
      rejecting the planned expenses related to the second data; and
      transmitting a notification that the planned expenses have been rejected; and
   when the second data is not greater than the first data, storing the second data in the public area;
   receiving third data input that specifies a new spending capacity for the department from the plurality of departments;
   in response to receiving the third data input, creating and storing third data in the public area, wherein the third data defines the new spending capacity for the department;
   receiving fourth data input that specifies one or more new planned expenses for the department;
   in response to receiving the fourth data input, creating and storing fourth data in the private area, wherein the fourth data defines the one or more new planned expenses based on the fourth data input;
   automatically determining whether the fourth data is greater than the third data;
   when the fourth data is greater than the third data,
      rejecting the new planned expenses related to the fourth data; and
      transmitting a notification that the new planned expenses have been rejected; and
   when the fourth data is not greater than the third data, replacing the second data with the fourth data in the public area,
   wherein each private area is comprised of one or more computer memory locations assigned to each respective department, and wherein the public area is comprised of one or more computer memory locations assigned to the plurality of departments.

2. A method as recited in claim 1, further comprising the computer-implemented steps of:
   when the second data input is greater than the first data input, receiving a request to increase the spending capacity for the department;
   determining whether the request is allowable; and
   when the request is allowable, updating the spending capacity for the department.

3. A non-transitory computer-readable medium carrying one or more sequences of instructions for financial planning by managing stored data values representing spending resources of an organization, wherein execution of the one or more sequences of instructions by one or more processors causes the one or more processors to perform the steps of:
   receiving first data input that specifies a spending capacity for at least a portion of the organization;
   in response to receiving the first data input, creating and storing spending capacity data in a public area, wherein the spending capacity data defines the spending capacity based on the first data input, and wherein the public area is accessible by every member of the organization;
   receiving second data input that specifies one or more planned expense allocations for the portion of the organization;
   in response to receiving the second data input, creating and storing planned expense data in a private area, wherein the planned expense data defines the one or more planned expense allocations based on the second data input, and wherein the private area is only accessible by members of the portion of the organization, and wherein the private area is separate from the public area;
   automatically determining whether the planned expense data exceeds the spending capacity data;
   storing the planned expense data in the public area only when the planned expense data does not exceed the spending capacity data, otherwise, transmitting a notification that the planned expense data exceeds the spending capacity data;
   receiving third data input that specifies a new spending capacity for the portion of the organization;
   in response to receiving the third data input, creating and storing new spending capacity data in the public area, wherein the new spending capacity data defines the new spending capacity based on the third data input;
   receiving fourth data input that specifies one or more new planned expense allocations for the portion of the organization;
   in response to receiving the fourth data input, creating and storing new planned expense data in the private area, wherein the new planned expense data defines the one or more new planned expense allocations based on the fourth data input, and wherein the new planned expense data represents a revised version of the one or more planned expense allocations based on the second data input;

automatically determining whether the new planned expense data exceeds the new spending capacity data; and replacing the planned expense data in the public area with the new planned expense data only when the new planned expense data does not exceed the new spending capacity data, otherwise, transmitting a notification that the new planned expense data exceeds the new spending capacity data.

4. A computer-automated apparatus for financial planning that manages stored data values representing spending resources of an organization, comprising:

a processor;

a non-transitory computer-readable medium comprising:
   a department object comprising:
     a first plan object for storing, in a public area, spending capacity data for at least a portion of the organization, wherein the public area is accessible by every member of the organization;
     a second plan object for storing, in a private area, planned expense data for the portion of the organization, wherein the private area is accessible only by members of the portion of the organization, and wherein the private area is separate from the public area; and
     a third plan object for storing, in the public area, public planned expense data for the portion of the organization; and
   a software module that, when executed by the processor, performs steps of:
     receiving a first data input that specifies a spending capacity for the portion of the organization;
     creating and storing, in response to receiving the first data input, the spending capacity data in the first plan object, wherein the stored spending capacity data comprises the spending capacity based on the first data input;
     receiving a second data input that specifies one or more planned expense allocations for the portion of the organization;
     creating and storing, in response to receiving the second data input, the planned expense data in the second plan object, wherein the stored planned expense data comprises the one or more planned expense allocations based on the second data input;
     automatically determining whether the planned expense data exceeds the spending capacity data;
     storing the planned expense data in the third plan object as the public planned expense data only when the planned expense data does not exceed the spending capacity data, otherwise, transmitting a notification that the planned expense data exceeds the spending capacity data;
     receiving a third data input that specifies a new spending capacity for the portion of the organization;
     creating and storing, in response to receiving the third data input, new spending capacity data in the first plan object, wherein the new spending capacity data defines the new spending capacity based on the third data input;
     receiving a fourth data input that specifies one or more new planned expense allocations for the portion of the organization;
     creating and storing, in response to receiving the fourth data input, new planned expense data in the second plan object, wherein the new planned expense data defines the one or more new planned expense allocations based on the fourth data input, and wherein the new planned expense data represents a revised version of the one or more planned expense allocations based on the second data input;
     automatically determining whether the new planned expense data exceeds the new spending capacity data; and
     replacing the planned expense data stored in the third plan object as the public planned expense data with the new planned expense data only when the new planned expense data does not exceed the new spending capacity data, otherwise, transmitting a notification that the new planned expense data exceeds the new spending capacity data.

5. A computer-automated apparatus for financial planning that manages stored data values representing spending resources of an organization, comprising:

a network interface that is coupled to a data network for receiving one or more packet flows therefrom;

a processor communicatively coupled to the network interface;

one or more stored sequences of instructions which, when executed by the processor, cause the processor to carry out the steps of:
   receiving first data input that specifies a spending capacity for at least a portion of the organization;
   in response to receiving the first data input, creating and storing spending capacity data in a public area, wherein the spending capacity data defines the spending capacity based on the first data input, and wherein the public area is accessible by every member of the organization;
   receiving second data input that specifies one or more planned expense allocations for the portion of the organization;
   in response to receiving the second data input, creating and storing planned expense data in a private area, wherein the planned expense data defines the one or more planned expense allocations based on the second data input, and wherein the private area is only accessible by members of the portion of the organization, and wherein the private area is separate from the public area;
   automatically determining whether the planned expense data exceeds the spending capacity data; and
   storing the planned expense data in the public area only when the planned expense data does not exceed the spending capacity data, otherwise, transmitting a notification that the planned expense data exceeds the spending capacity data;
   receiving third data input that specifies a new spending capacity for the portion of the organization;
   in response to receiving the third data input, creating and storing new spending capacity data in the public area, wherein the new spending capacity data defines the new spending capacity based on the third data input;
   receiving fourth data input that specifies one or more new planned expense allocations for the portion of the organization;

in response to receiving the fourth data input, creating and storing new planned expense data in the private area, wherein the new planned expense data defines the one or more planned expense allocations based on the fourth data input, and wherein the new planned expense data represents a revised version of the one or more planned expense allocations based on the second data input;

automatically determining whether the new planned expense data exceeds the new spending capacity data; and replacing the planned expense data in the public area with the new planned expense data only when the new planned expense data does not exceed the new spending capacity data, otherwise, transmitting a notification that the new planned expense data exceeds the new spending capacity data.

* * * * *

UNITED STATES PATENT AND TRADEMARK OFFICE
CERTIFICATE OF CORRECTION

PATENT NO.       : 8,433,632 B2                                                     Page 1 of 1
APPLICATION NO.  : 09/804851
DATED            : April 30, 2013
INVENTOR(S)      : Sarat C. Sankaran, Vineet Jalin and Nancy B. Capelli It is certified that error appears in the above-identified patent and that said Letters Patent is hereby corrected as shown below:

Title Page, Item (54) and in the Specification, column 1, Title of Invention, insert --Planning-- after the "Financial"

Signed and Sealed this
Twenty-first Day of October, 2014

Michelle K. Lee
*Deputy Director of the United States Patent and Trademark Office*